United States Patent
Sagert et al.

(10) Patent No.: US 8,103,493 B2
(45) Date of Patent: Jan. 24, 2012

(54) SYSTEM AND METHOD FOR PERFORMING OILFIELD OPERATIONS

(75) Inventors: Russ Sagert, Katy, TX (US); Randolph E. F. Pepper, Beijing (CN); Bruce Cornish, Houston, TX (US); Bill Gillock, Houston, TX (US); Mark Passolt, Houston, TX (US); Amit Lodh, Houston, TX (US); Shashi Menon, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 516 days.

(21) Appl. No.: 12/237,872

(22) Filed: Sep. 25, 2008

(65) Prior Publication Data

US 2009/0089028 A1    Apr. 2, 2009

Related U.S. Application Data

(60) Provisional application No. 60/995,840, filed on Sep. 29, 2007.

(51) Int. Cl.
G06G 7/48 (2006.01)
G06G 7/57 (2006.01)

(52) U.S. Cl. .......................................................... 703/10
(58) Field of Classification Search ..................... 703/10
See application file for complete search history.

(56) References Cited

U.S. PATENT DOCUMENTS

| | | | |
|---|---|---|---|
| 5,992,519 A | 11/1999 | Ramakrishnan et al. | |
| 6,012,015 A * | 1/2000 | Tubel | 702/6 |
| 6,313,837 B1 | 11/2001 | Assa et al. | |
| 6,832,159 B2 * | 12/2004 | Smits et al. | 702/11 |
| 6,980,940 B1 * | 12/2005 | Gurpinar et al. | 703/10 |
| 7,172,037 B2 * | 2/2007 | Dashevskiy et al. | 175/25 |
| 7,248,259 B2 | 7/2007 | Fremming et al. | |
| 2002/0013687 A1 * | 1/2002 | Ortoleva | 703/10 |
| 2003/0216897 A1 | 11/2003 | Endres et al. | |
| 2004/0148147 A1 * | 7/2004 | Martin | 703/10 |
| 2004/0220846 A1 | 11/2004 | Cullick et al. | |
| 2005/0149307 A1 | 7/2005 | Gurpinar et al. | |
| 2006/0197759 A1 | 9/2006 | Fremming | |

(Continued)

FOREIGN PATENT DOCUMENTS

WO    9964896    12/1999

(Continued)

OTHER PUBLICATIONS

Roxar Launches IRAP RMS Uncertainty Management, Stavanger, Norway, Nov. 27, 2006, 3 pages.

(Continued)

*Primary Examiner* — Kamini S Shah
*Assistant Examiner* — Suzanne Lo

(57) ABSTRACT

Systems and methods of performing oilfield operations for an oilfield are provided. The oilfield has a subterranean formation with geological structures and reservoirs therein. A plurality of oilfield modules are positioned in an application. Each of the oilfield modules models at least a portion or attribute of the oilfield. The oilfield modules are selectively connected via a connection. The connections may be integrated connections providing cooperation for integrated modeling therebetween and/or dynamic connections providing knowledge sharing for unified modeling therebetween whereby at least one oilfield model is generated. At least one internal database may be positioned in the application for collecting oilfield data and operatively connected to the of oilfield modules. At least one oilfield model is generated using the oilfield data and the oilfield modules.

20 Claims, 10 Drawing Sheets

U.S. PATENT DOCUMENTS

2007/0112547 A1     5/2007     Ghorayeb et al.
2007/0168169 A1     7/2007     Neave
2010/0057418 A1*    3/2010     Li et al. ................... 703/10

FOREIGN PATENT DOCUMENTS

WO        2004049216       6/2004

OTHER PUBLICATIONS

Schlumberger, Petrel, Enhance Precision Geosteering and Decision Making with Real-Time 3D Modeling Using Petrel Workflow Tools, May 2005, 2 pages.

Flagship Geoscience, L.L.C., Stratmagic as a Reservoir Characterization Tool, A Case Study in the Caddo & Vineyard Formations—Central Texas, Sep. 1998, 9 pages.

Paradigm, Paradigm Announces Geolog Version 6.6, Press Release, Amsterdam, Netherlands, Jun. 20, 2005, 2 pages.

VoxelGeo, Volume-Based Seismic Interpretation, 2005, 6 pages.

GeoGraphix, Aries System, 2006, 4 pages.

Bechtold, B., Discovery on OpenWorks Software Enables Direct Access to Existing OpenWorks Projects Using Windows-Based Tools, Feb. 2006, 4 pages.

Halliburton, Dynamic Asset Modeling, 2006, 2 pages.

Examination Report of British Application Serial No. 1004496.4 (94.0162GB) dated May 24, 2011.

Examination Report of British Application Serial No. 1004496.4 (94.0162GB) dated Jul. 11, 2011.

Examination Report of Cooperation Council for the Arab States of the Gulf Application Serial No. GCC/P/2008/11888 (94.0162GC) dated Aug. 3, 2011.

* cited by examiner

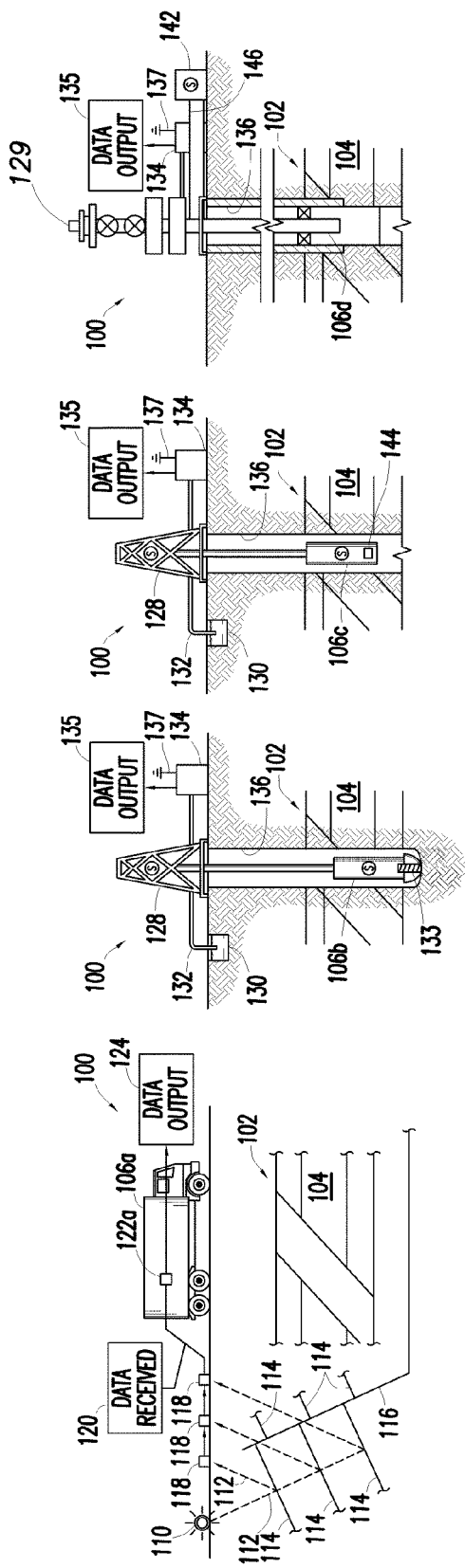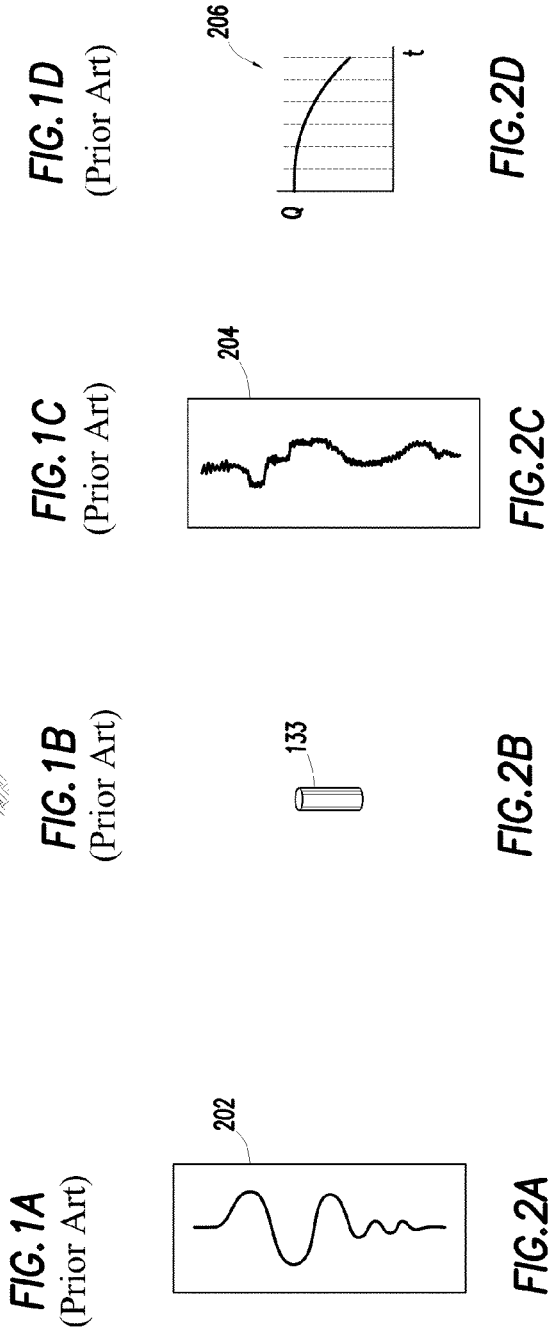

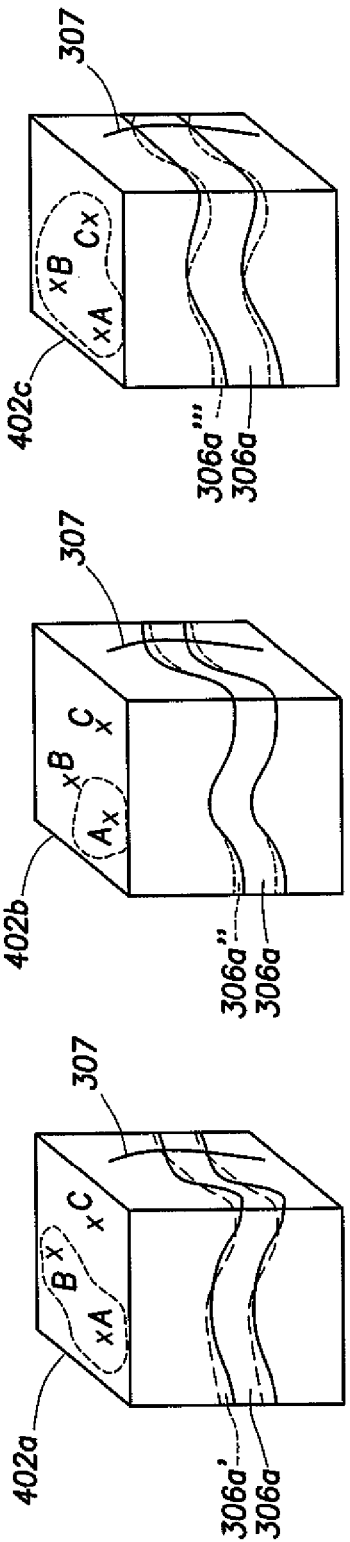
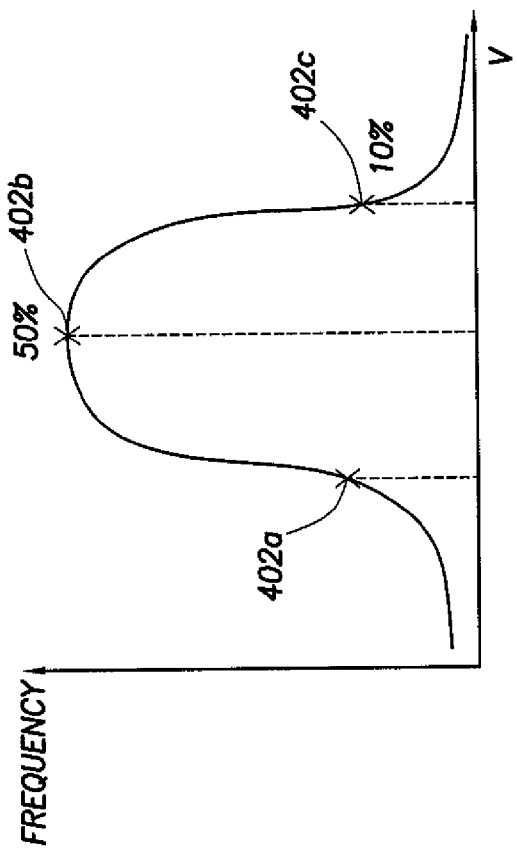
FIG.4A  FIG.4B  FIG.4C
FIG.5

SYSTEM AND METHOD FOR PERFORMING OILFIELD OPERATIONS

CROSS REFERENCE TO RELATED APPLICATIONS

This application claims priority under 35 U.S.C. §119(e) from Provisional Patent Application No. 60/995,840 filed Sep. 29, 2007.

BACKGROUND OF THE INVENTION

1. Field of the Invention

The present invention relates to techniques for performing oilfield operations relating to subterranean formations having reservoirs therein. More particularly, the invention relates to techniques for performing oilfield operations involving an analysis of oilfield conditions, such as geological, geophysical and reservoir engineering characteristics, and their impact on such operations.

2. Background of the Related Art

Oilfield operations, such as surveying, drilling, wireline testing, completions, production, planning and oilfield analysis, are typically performed to locate and gather valuable downhole fluids. Various aspects of the oilfield and its related operations are shown in FIGS. 1A-1D. As shown in FIG. 1A, surveys are often performed using acquisition methodologies, such as seismic scanners or surveyors to generate maps of underground formations. These formations are often analyzed to determine the presence of subterranean assets, such as valuable fluids or minerals. This information is used to assess the underground formations and locate the formations containing the desired subterranean assets. This information may also be used to determine whether the formations have characteristics suitable for storing fluids. Data collected from the acquisition methodologies may be evaluated and analyzed to determine whether such valuable assets are present, and if they are reasonably accessible.

As shown in FIGS. 1B-1D, one or more wellsites may be positioned along the underground formations to gather valuable fluids from the subterranean reservoirs. The wellsites are provided with tools capable of locating and removing hydrocarbons, such as oil or gas, from the subterranean reservoirs. As shown in FIG. 1B, drilling tools are typically deployed from the oil and gas rigs and advanced into the earth along a path to locate reservoirs containing the valuable downhole assets. Fluid, such as drilling mud or other drilling fluids, is pumped down the wellbore through the drilling tool and out the drilling bit. The drilling fluid flows through the annulus between the drilling tool and the wellbore and out the surface, carrying away earth loosened during drilling. The drilling fluids return the earth to the surface, and seals the wall of the wellbore to prevent fluid in the surrounding earth from entering the wellbore and causing a 'blow out.'

During the drilling operation, the drilling tool may perform downhole measurements to investigate downhole conditions. The drilling tool may be used to take core samples of the subsurface formations. In some cases, as shown in FIG. 1C, the drilling tool is removed and a wireline tool is deployed into the wellbore to perform additional downhole testing, such as logging or sampling. Steel casing may be run into the well to a desired depth and cemented into place along the wellbore wall. Drilling may be continued until the desired total depth is reached.

After the drilling operation is complete, the well may then be prepared for production. As shown in FIG. 1D, wellbore completions equipment is deployed into the wellbore to complete the well in preparation for the production of fluid therethrough. Fluid is then allowed to flow from downhole reservoirs, into the wellbore and to the surface. Production facilities are positioned at surface locations to collect the hydrocarbons from the wellsite(s). Fluid drawn from the subterranean reservoir(s) passes to the production facilities via transport mechanisms, such as tubing. Various equipments may be positioned about the oilfield to monitor oilfield parameters, to manipulate the oilfield operations and/or to separate and direct fluids from the wells. Surface equipment and completion equipment may also be used to inject fluids into reservoirs, either for storage or at strategic points to enhance production of the reservoir.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure and geological stratigraphy that define geological structures of the subterranean formation. Dynamic data relates to, for example, fluids flowing through the geologic structures of the subterranean formation over time. Such static and/or dynamic data may be collected to learn more about the formations and the valuable assets contained therein.

Sources used to collect static data may be seismic tools, such as a seismic truck that sends compression waves into the earth as shown in FIG. 1A. Signals from these waves are processed and interpreted to characterize changes in the anisotropic and/or elastic properties, such as velocity and density, of the geological formation at various depths. This information may be used to generate basic structural maps of the subterranean formation. Other static measurements may be gathered using downhole measurements, such as core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing and other completion equipment as shown in FIG. 1D. As fluid passes to the surface, various dynamic measurements, such as fluid flow rates, pressure and composition may be monitored. These parameters may be used to determine various characteristics of the subterranean formation.

Sensors may be positioned about the oilfield to collect data relating to various oilfield operations. For example, sensors in the drilling equipment may monitor drilling conditions, sensors in the wellbore may monitor fluid composition, sensors located along the flow path may monitor flow rates and sensors at the processing facility may monitor fluids collected. Other sensors may be provided to monitor downhole, surface, equipment or other conditions. Such conditions may relate to the type of equipment at the wellsite, the operating setup, formation parameters or other variables of the oilfield. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The data may be used to predict downhole conditions, and make decisions concerning oilfield operations. Such decisions may involve well planning, well targeting, well completions, operating levels, production rates and other operations and/or operating parameters. Often this information is used to determine when to drill new wells, re-complete existing wells or alter wellbore production. Oilfield conditions, such as geological, geophysical and reservoir engineering characteristics, may have an impact on oilfield operations, such as risk analysis, economic valuation, and mechanical considerations for the production of subsurface reservoirs.

Data from one or more wellbores may be analyzed to plan or predict various outcomes at a given wellbore. In some cases, the data from neighboring wellbores, or wellbores with similar conditions or equipment may be used to predict how a well will perform. There are usually a large number of variables and large quantities of data to consider in analyzing oilfield operations. It is, therefore, often useful to model the behavior of the oilfield operation to determine a desired course of action. During the ongoing operations, the operating parameters may need adjustment as oilfield conditions change and new information is received.

Techniques have been developed to model the behavior of geological formations, downhole reservoirs, wellbores, surface facilities as well as other portions of the oilfield operation. Examples of these modeling techniques are shown in Patent/Publication/Application Nos. U.S. Pat. No. 5,992,519, WO2004/049216, WO1999/064896, U.S. Pat. No. 6,313,837, US2003/0216897, U.S. Pat. No. 7,248,259, US2005/0149307 and US2006/0197759. Typically, existing modeling techniques have been used to analyze only specific portions of the oilfield operations. More recently, attempts have been made to use more than one model in analyzing certain oilfield operations. See, for example, Patent/Publication/Application Nos. U.S. Pat. No. 6,980,940, WO2004/049216, US2004/0220846 and Ser. No. 10/586,283. Additionally, techniques for modeling certain aspects of an oilfield have been developed, such as OPENWORKS™ with, e.g., SEISWORKS™, STRATWORKST™, GEOPROBE™ or ARIES™ by LANDMARK™; VOXELGEO™, GEOLOG™ and STRATIMAGIC™ by PARADIGM™; JEWELSUITE™ by JOA™; RMS™ products by ROXAR™, and PETREL™ by SCHLUMBERGER™.

Despite the development and advancement of various aspects of oilfield analysis, there remains a need to provide techniques capable of performing a complex analysis of oilfield operations based on a wide variety of parameters affecting such operations. It is desirable that such a complex analysis provide a unified view of selective portions of the oilfield operation, such as geological, geophysical, reservoir engineering, drilling, production engineering, economic and/or other aspects of the oilfield. This unified view may be used to view, analyze and/or understand the co-dependencies of the individual portion(s) of the oilfield operations and the interaction therebetween. Such a system would preferably permit consideration of a wider variety and/or quantity of data affecting the oilfield to generate a common understanding of current and/or future conditions of the oilfield by selectively connecting desired modules throughout the oilfield. Preferably, the provided techniques would be capable of one of more of the following, among others: calibrating measurements from different scales (methods of measurement and volume of influence for such measurements), efficiently analyzing data from a wide variety of sources, generating static models based on any known measurements, selectively modeling based on a variety of inputs, selectively simulating according to dynamic inputs, adjusting models based on probabilities, selectively connecting models of a variety of functions (e.g. economic risk and viability), selectively performing feedback loops throughout the process, selectively storing and/or replaying various portions of the process, selectively displaying and/or visualizing outputs (e.g. displays, reports, etc.), selectively updating the models as new measurements become available, providing the ability to numerically simulate static and dynamic properties, providing the ability to perform economic analysis throughout the modeling system, selectively performing desired modeling (e.g. uncertainty modeling), providing workflow knowledge capture, enabling scenario planning and testing, providing reserves reporting with associated audit trail reporting, dynamically connecting selective models in an application and generating a surface model from selected oilfield modules.

SUMMARY OF THE INVENTION

In at least one aspect, the invention relates to a system for performing oilfield operations for an oilfield, the oilfield having a subterranean formation with geological structures and reservoirs therein. The system is provided with a plurality of oilfield modules positioned in an application, and a connection between each of the plurality of oilfield modules. Each of the oilfield modules models at least a portion of the oilfield. At least one of the connections is a dynamic connection providing knowledge sharing for unified modeling therebetween whereby at least one oilfield model is generated.

In another aspect, the invention relates to a system for performing oilfield operations for an oilfield, the oilfield having a subterranean formation with geological structures and reservoirs therein. The system provided with a plurality of oilfield modules for modeling at least a portion of the oilfield, at least one internal database positioned in the application and operatively connected to at least one of the plurality of oilfield modules and at least one connection between each of the plurality of oilfield modules. The oilfield modules are positioned in an application. At least one of the connections is an integrated connection providing cooperation for integrated modeling therebetween whereby at least one oilfield model is generated.

In yet another aspect, the invention relates to a method of performing oilfield operations for an oilfield, the oilfield having a subterranean formation with geological structures and reservoirs therein. The method involves collecting oilfield data, positioning a plurality of oilfield modules in an application, selectively connecting at least a portion of the plurality of oilfield modules via a dynamic connection for knowledge sharing therebetween and generating at least one oilfield model using the oilfield data and the plurality of oilfield modules.

Finally, in another aspect, the invention relates to a method of performing oilfield operations for an oilfield, the oilfield having a subterranean formation with geological structures and reservoirs therein. The method involves collecting oilfield data in a database positioned in an application, positioning a plurality of oilfield modules in the application, selectively connecting at least a portion of the plurality of oilfield modules via an integrated connection providing cooperation therebetween, and generating at least one oilfield model using the oilfield data and the plurality of oilfield modules.

Other aspects of the invention may be determined from the description herein.

BRIEF DESCRIPTION OF THE DRAWINGS

So that the above described features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIGS. 1A-1D depict a simplified, schematic view of an oilfield having subterranean formations containing reservoirs therein, the various oilfield operations being performed on the oilfield. FIG. 1A depicts a survey operation being performed by a seismic truck. FIG. 1B depicts a drilling operation being performed by a drilling tool suspended by a rig and advanced into the subterranean formations. FIG. 1C depicts a wireline operation being performed by a wireline tool suspended by the rig and into the wellbore of FIG. 1B. FIG. 1D depicts a production operation being performed by a production tool being deployed from a production unit and into the completed wellbore of FIG. 1C for drawing fluid from the reservoirs into surface facilities.

FIGS. 2A-D are graphical depictions of data collected by the tools of FIGS. 1A-D, respectively. FIG. 2A depicts a seismic trace of the subterranean formation of FIG. 1A. FIG. 2B depicts a core test result of the core sample of FIG. 1B. FIG. 2C depicts a well log of the subterranean formation of FIG. 1C. FIG. 2D depicts a production decline curve of fluid flowing through the subterranean formation of FIG. 1D.

FIGS. 4A-4C are schematic, 3D views of static models based on the data acquired by the data acquisition tools of FIG. 3.

FIG. 5 is graphical representation of a probability plot of the static models of FIG. 4.

FIG. 6A depicts an independent database system having a plurality of separate oilfield modules (with corresponding separate applications) and a report generator, the modules connected to a shared database for passing events to and from the shared database. FIG. 6B depicts an independent process system with real-time functionality, the independent process system having a plurality of separate oilfield modules (with corresponding separate applications) for generating a combined earth model, the modules connected to pass data and events in a uni-directional flow therebetween.

FIG. 7A depicts a uni-directional integrated system with economics capabilities, the unidirectional integrated system having a plurality of oilfield modules positioned in the same application, the modules generating a shared earth model. FIG. 7B depicts a bidirectional integrated system with database functionality, the bidirectional integrated system having a plurality of oilfield modules positioned in the same application and generating at least one integrated earth model.

DETAILED DESCRIPTION

Figure 3:
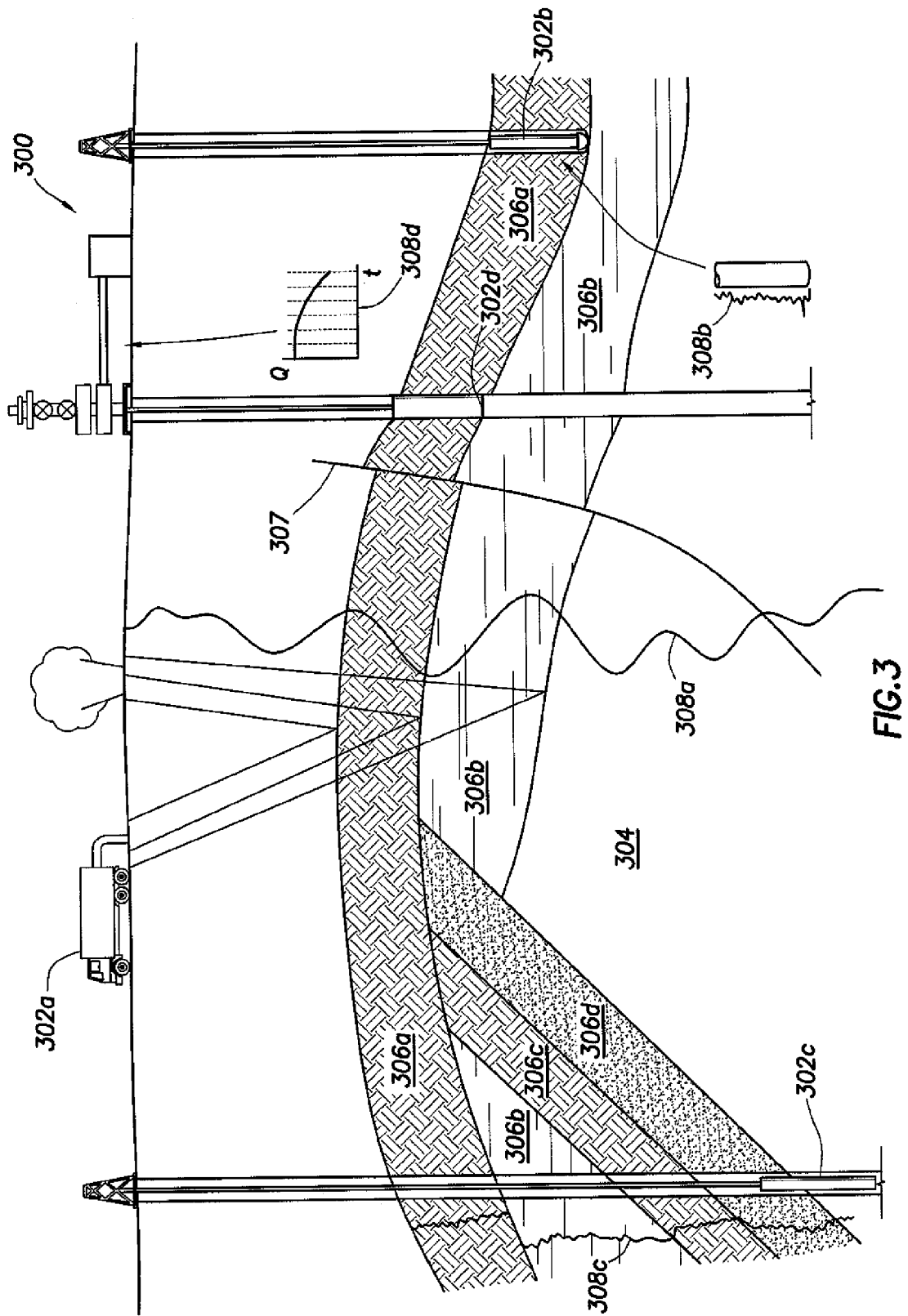
FIG. 3 is a schematic view, partially in cross section of an oilfield having a plurality of data acquisition tools positioned at various locations along the oilfield for collecting data from the subterranean formations.

Presently preferred embodiments of the invention are shown in the above-identified FIGS. and described in detail below. In describing the preferred embodiments, like or identical reference numerals are used to identify common or similar elements. The FIGS. are not necessarily to scale and certain features and certain views of the FIGS. may be shown exaggerated in scale or in schematic in the interest of clarity and conciseness.

FIGS. 1A-1D depict simplified, representative, schematic views of an oilfield (100) having subterranean formation (102) containing reservoir (104) therein and depicting various oilfield operations being performed on the oilfield. FIG. 1A depicts a survey operation being performed by a survey tool, such as seismic truck (106a), to measure properties of the subterranean formation. The survey operation is a seismic survey operation for producing sound vibrations. In FIG. 1A, one such sound vibration (112) generated by a source (110) reflects off a plurality of horizons (114) in an earth formation (116). The sound vibration(s) (112) is (are) received in by sensors, such as geophone-receivers (118), situated on the earth's surface, and the geophones (118) produce electrical output signals, referred to as data received (120) in FIG. 1A.

In response to the received sound vibration(s) (112) representative of different parameters (such as amplitude and/or frequency) of the sound vibration(s) (112), the geophones (118) produce electrical output signals containing data concerning the subterranean formation. The data received (120) is provided as input data to a computer (122a) of the seismic truck (106a), and responsive to the input data, the computer (122a) generates a seismic data output (124). The seismic data output may be stored, transmitted or further processed as desired, for example by data reduction.

FIG. 1B depicts a drilling operation being performed by a drilling tools (106b) suspended by a rig (128) and advanced into the subterranean formations (102) to form a wellbore (136). A mud pit (130) is used to draw drilling mud into the drilling tools via flow line (132) for circulating drilling mud through the drilling tools, up the wellbore (136) and back to the surface. The drilling mud is usually filtered and returned to the mud pit. A circulating system may be used for storing, controlling or filtering the flowing drilling muds. The drilling tools are advanced into the subterranean formations to reach reservoir (104). Each well may target one or more reservoirs. The drilling tools are preferably adapted for measuring downhole properties using logging while drilling tools. The logging while drilling tool may also be adapted for taking a core sample (133) as shown, or removed so that a core sample may be taken using another tool.

A surface unit (134) is used to communicate with the drilling tools and/or offsite operations. The surface unit is capable of communicating with the drilling tools to send commands to the drilling tools, and to receive data therefrom. The surface unit is preferably provided with computer facilities for receiving, storing, processing, and/or analyzing data from the oilfield. The surface unit collects data generated during the drilling operation and produces data output (135) which may be stored or transmitted. Computer facilities, such as those of the surface unit, may be positioned at various locations about the oilfield and/or at remote locations.

Sensors (S), such as gauges, may be positioned about the oilfield to collect data relating to various oilfield operations as described previously. As shown, the sensor (S) is positioned in one or more locations in the drilling tools and/or at the rig to measure drilling parameters, such as weight on bit, torque on bit, pressures, temperatures, flow rates, compositions, rotary speed and/or other parameters of the oilfield operation. Sensors may also be positioned in one or more locations in the circulating system.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering. The reservoir, wellbore, surface and/or process data may be used to perform reservoir, wellbore, geological, geophysical or other simulations. The data outputs from the oilfield operation may be generated directly from the sensors, or after some preprocessing or modeling. These data outputs may act as inputs for further analysis.

The data may be collected and stored at the surface unit (134). One or more surface units may be located at the oilfield, or connected remotely thereto. The surface unit may be a single unit, or a complex network of units used to perform the necessary data management functions throughout the oilfield. The surface unit may be a manual or automatic system. The surface unit may be operated and/or adjusted by a user.

The surface unit may be provided with a transceiver (137) to allow communications between the surface unit and various portions of the oilfield or other locations. The surface unit may also be provided with or functionally connected to one or more controllers for actuating mechanisms at the oilfield. The surface unit may then send command signals to the oilfield in response to data received. The surface unit may receive commands via the transceiver or may itself execute commands to the controller. A processor may be provided to analyze the data (locally or remotely), make the decisions and/or actuate the controller. In this manner, the oilfield may be selectively adjusted based on the data collected. This technique may be used to optimize portions of the oilfield operation, such as controlling drilling, weight on bit, pump rates or other parameters. These adjustments may be made automatically based on computer protocol, and/or manually by an operator. In some cases, well plans may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool is preferably adapted for deployment into a wellbore for generating well logs, performing downhole tests and/or collecting samples. The wireline tool may be used to provide another method and apparatus for performing a seismic survey operation. The wireline tool of FIG. 1C may, for example, have an explosive, radioactive, electrical, or acoustic energy source (144) that sends and/or receives electrical signals to the surrounding subterranean formations (102) and fluids therein.

The wireline tool may be operatively connected to, for example, the geophones (118) and the computer (122a) of the seismic truck (106a) of FIG. 1A. The wireline tool may also provide data to the surface unit (134). The surface unit collects data generated during the wireline operation and produces data output (135) which may be stored or transmitted. The wireline tool may be positioned at various depths in the wellbore to provide a survey or other information relating to the subterranean formation.

Sensors (S), such as gauges, may be positioned about the oilfield to collect data relating to various oilfield operations as described previously. As shown, the sensor (S) is positioned in the wireline tool to measure downhole parameters which relate to, for example porosity, permeability, fluid composition and/or other parameters of the oilfield operation.

FIG. 1D depicts a production operation being performed by a production tool (106d) deployed from a production unit or Christmas tree (129) and into the completed wellbore (136) of FIG. 1C for drawing fluid from the downhole reservoirs into surface facilities (142). Fluid flows from reservoir (104) through perforations in the casing (not shown) and into the production tool (106d) in the wellbore (136) and to the surface facilities (142) via a gathering network (146).

Sensors S, such as gauges, may be positioned about the oilfield to collect data relating to various oilfield operations as described previously. As shown, the sensor S may be positioned in the production tool (106d) or associated equipment, such as the Christmas tree, gathering network, surface facilities and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIGS. 1B-D depict tools used to measure properties of an oilfield, it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The oilfield configuration of FIGS. 1A-D is intended to provide a brief description of an example of an oilfield usable with the present invention. Part, or all, of the oilfield may be on land, water and/or sea. Also, while a single oilfield measured at a single location is depicted, the present invention may be utilized with any combination of one or more oilfields, one or more processing facilities and one or more wellsites.

FIGS. 2A-D are graphical depictions of examples of data collected by the tools of FIGS. 1A-D, respectively. FIG. 2A depicts a seismic trace (202) of the subterranean formation of FIG. 1A taken by seismic truck (106a). The seismic trace may be used to provide data, such as a two-way response over a period of time. FIG. 2B depicts a core sample (133) taken by the drilling tools (106b). The core sample may be used to provide data, such as a graph of the density, porosity, permeability or other physical property of the core sample over the length of the core. Tests for density and viscosity may be performed on the fluids in the core at varying pressures and temperatures. FIG. 2C depicts a well log (204) of the subterranean formation of FIG. 1C taken by the wireline tool (106c). The wireline log typically provides a resistivity or other measurement of the formation at various depts. FIG. 2D depicts a production decline curve or graph (206) of fluid flowing through the subterranean formation of FIG. 1D measured at the surface facilities (142). The production decline curve typically provides the production rate Q as a function of time t.

The respective graphs of FIGS. 2A-2C depict examples of static measurements that may describe or provide information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2D depicts an example of a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

FIG. 3 is a schematic view, partially in cross section of an oilfield (300) having data acquisition tools (302a), (302b), (302c) and (302d) positioned at various locations along the oilfield for collecting data of the subterranean formation 304. The data acquisition tools (302a)-(302d) may be the same as data acquisition tools (106a)-(106d) of FIGS. 1A-D, respectively, or others not depicted. As shown, the data acquisition tools (302a)-(302d) generate data plots or measurements (308a)-(308d), respectively. These data plots are depicted along the oilfield to demonstrate the data generated by the various operations.

Data plots (308a)-(308c) are examples of static data plots that may be generated by the data acquisition tools (302a)-(302d), respectively. Static data plot (308a) is a seismic two-way response time and may be the same as the seismic trace (202) of FIG. 2A. Static plot (308b) is core sample data measured from a core sample of the formation (304), similar to core sample (133) of FIG. 2B. Static data plot (308c) is a logging trace, similar to the well log (204) of FIG. 2C. Production decline curve or graph (308d) is a dynamic data plot of the fluid flow rate over time, similar to the graph (206) of FIG. 2D. Other data may also be collected, such as historical data, user inputs, economic information and/or other measurement data and other parameters of interest.

The subterranean structure (304) has a plurality of geological formations (306a)-(306d). As shown, the structure has several formations or layers, including a shale layer (306a), a carbonate layer (306b), a shale layer (306c) and a sand layer (306d). A fault (307) extends through the layers (306a), (306b). The static data acquisition tools are preferably adapted to take measurements and detect characteristics of the formations.

While a specific subterranean formation with specific geological structures are depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more location across one or more oilfields or other locations for comparison and/or analysis.

The data collected from various sources, such as the data acquisition tools of FIG. 3, may then be processed and/or evaluated. Typically, seismic data displayed in the static data plot (308a) from the data acquisition tool (302a) is used by a geophysicist to determine characteristics of the subterranean formations and features. Core data shown in static plot (308b) and/or log data from the well log (308c) are typically used by a geologist to determine various characteristics of the subterranean formation. Production data from the graph (308d) is typically used by the reservoir engineer to determine fluid flow reservoir characteristics. The data analyzed by the geologist, geophysicist and the reservoir engineer may be analyzed using modeling techniques. Examples of modeling techniques are described in Patent/Publication/Application No. U.S. Pat. No. 5,992,519, WO2004/049216, WO1999/064896, U.S. Pat. No. 6,313,837, US2003/0216897, U.S. Pat. No. 7,248,259, US2005/0149307 and US2006/0197759. Systems for performing such modeling techniques are described, for example, in issued U.S. Pat. No. 7,248,259, the entire contents of which is hereby incorporated by reference.

FIGS. 4A-4C depict three-dimensional graphical representations of the subsurface referred to as a static model. The static model may be generated based on one or more of the models generated from, for example, the data gathered using the data acquisition tools (302a)-(302d). In the figures provided, the static models (402a)-(402c) are generated by the data acquisition tools (302a)-(302c) of FIG. 3, respectively. These static models may provide a bi-dimensional view of the subterranean formation (i.e., as an earth model), based on the data collected at the given location.

The static models may have different accuracies based on the types of measurements available, quality of data, location and other factors. While the static models of FIGS. 4A-4C are taken using certain data acquisition tools at a single location of the oilfield, one or more of the same or different data acquisition tools may be used to take measurements at one or more locations throughout the oilfield to generate a variety of models. Various analysis and modeling techniques may be selected depending on the desired data type and/or location.

Each of the static models (402a-c) is depicted as volumetric representations of an oilfield with one or more reservoirs, and their surrounding formation structures. These volumetric representations are a prediction of the geological structure of the subterranean formation at the specified location based upon available measurements. Preferably, the representations are probable scenarios, created using the same input data (historical and/or real time), but having differing interpretation, interpolation, and modeling techniques. As shown, the static models contain geological layers within the subterranean formation. In particular fault (307) of FIG. 3 extends through each of the models. Each static model also has reference points A, B and C located at specific positions along each of the static models. These static models and the specific reference points of the static models may be analyzed. For example, a comparison of the different static models may show differences in the structure of fault (307) and the adjacent layer (306a). Each of the reference points may assist in the comparison between the various static models. Adjustments may be made to the models based on an analysis of the various static models in FIGS. 4A-C, and an adjusted formation layer may be generated as will be described further below.

FIG. 5 depicts graphical representation of a probability plot of multiple static models, such as the models (402a)-(402c) of FIGS. 4A-4C. The graph depicts a range of reservoir attribute value (V), such as volumetrics, production rate, gross rock thickness, net pay, cumulative production, etc. The value of the reservoir attribute (V) can vary due to any static or dynamic component(s) being assessed, such as structure, porosity, permeability, fluid contact levels, etc. The variables are typically constrained in the modeling exercise to be within reasonable predictions of what the real reservoir(s) are capable of, or what has been observed in similar reservoirs. This graph is a histogram showing multiple model realizations that may be generated by the provided data. The variable results may be generated by varying multiple model parameters. The graph may then be generated by reviewing and estimating the probability of the models generated and plotting them.

As shown, all the model realizations that make up the distribution graph are equally probable in geological terms. The histogram indicates that static model (402a) provides a ninety percent probability of having at least that amount of variable (V). The histogram as shown also indicates that static model (402b) has a fifty percent probability of having at least that amount of variable (V), and static model (402c) a ten percent probability of having this higher amount. This graph suggests that static model (402c) is the more optimistic model estimate of variable (V). The static models and their associated likelihoods may be used, for example, in determining field development plans and surface facility production schemes. Combinations of static model representations, for example (402a) through (402c), are considered and analyzed to assess the risk and/or economic tolerance of field development plans.

Referring back to the static models of FIGS. 4A-4C, the models have been adjusted based on the dynamic data provided in the production of the graph (308d) of FIG. 3. The dynamic data either collected by data acquisition tool or predicted using modeling techniques, (302d) is applied to each of the static models (402a)-(402c). As shown, the dynamic data indicates that the fault (307) and layer (306a) as predicted by the static models may need adjustment. The layer (306a) has been adjusted in each model as shown by the dotted lines. The modified layer is depicted as (306a'), (306a") and (306a'") for the static models of FIGS. 4A-4C, respectively.

The dynamic data may indicate that certain static models provide a better representation of the oilfield. A static model's ability to match historical production rate data may be considered a good indication that it may also give accurate predictions of future production. In such cases, a preferred static model may be selected. In this case, while the static model of FIG. 4C may have the highest overall probability of accuracy based solely on the static model as shown in FIG. 5, an analysis of the dynamic model suggests that model of FIG. 4B is a better match. As shown in FIG. 4A-4C, a comparison of layers (306a) with layers (306a'), (306a") and (306a'") indicates that fault (307) with associated fluid transmissibility across the fault most closely matches the prediction provided by static model (402b).

In this example, the selected static model (402b) is modified based on the dynamic data. The resulting adjusted model (402b') has been adjusted to better match the production data. As shown, the position of the geological structure (306a) has been shifted to (306a") to account for the differences shown by the dynamic data. As a result, the static model may be adapted to better fit both the static and dynamic models.

In determining the best overall model, the static and/or dynamic data may be considered. In this case, when considering both the static and dynamic data, the static model (402b) of FIG. 4B is selected as the earth model with the highest probability of accuracy based on both the static probabilities and dynamic input. To obtain the best overall model, it may be desirable to consider the static and dynamic data from multiple sources, locations, and/or types of data.

The evaluation of the various static and dynamic data of FIG. 3 involves considerations of static data, such as seismic data (308a) considered by a geophysicist, geological data (308b, 308c) considered by a geologist, and production data (308d) considered by a reservoir engineer. Each individual typically considers data relating to a specific function and provides models based on this specific function. However, as depicted in FIGS. 4A-4C, information from each of the separate models may affect the decision on the best overall model. Moreover, information from other models or sources may also affect adjustments to the model and/or selection of the best overall earth model. The earth model generated as described in FIGS. 4A-5 is a basic earth model determined from an analysis of the various models provided.

Another source of information that may affect the model(s) is economic information. Throughout the oilfield operations depicted in FIGS. 1A-1D, there are numerous business considerations. For example, the equipment used in each of these figures has various costs and/or risks associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment, accuracy and sensitivity of the measurement tools, data representations, and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation, rate of production, type of equipment, and other factors that will affect the costs and risks associated with the oilfield operation. The characteristics and operations of the surface equipments and various business data described above may be described in a surface model for modeling oilfield operations, for example based on the oilfield plan.

Figure 6A:
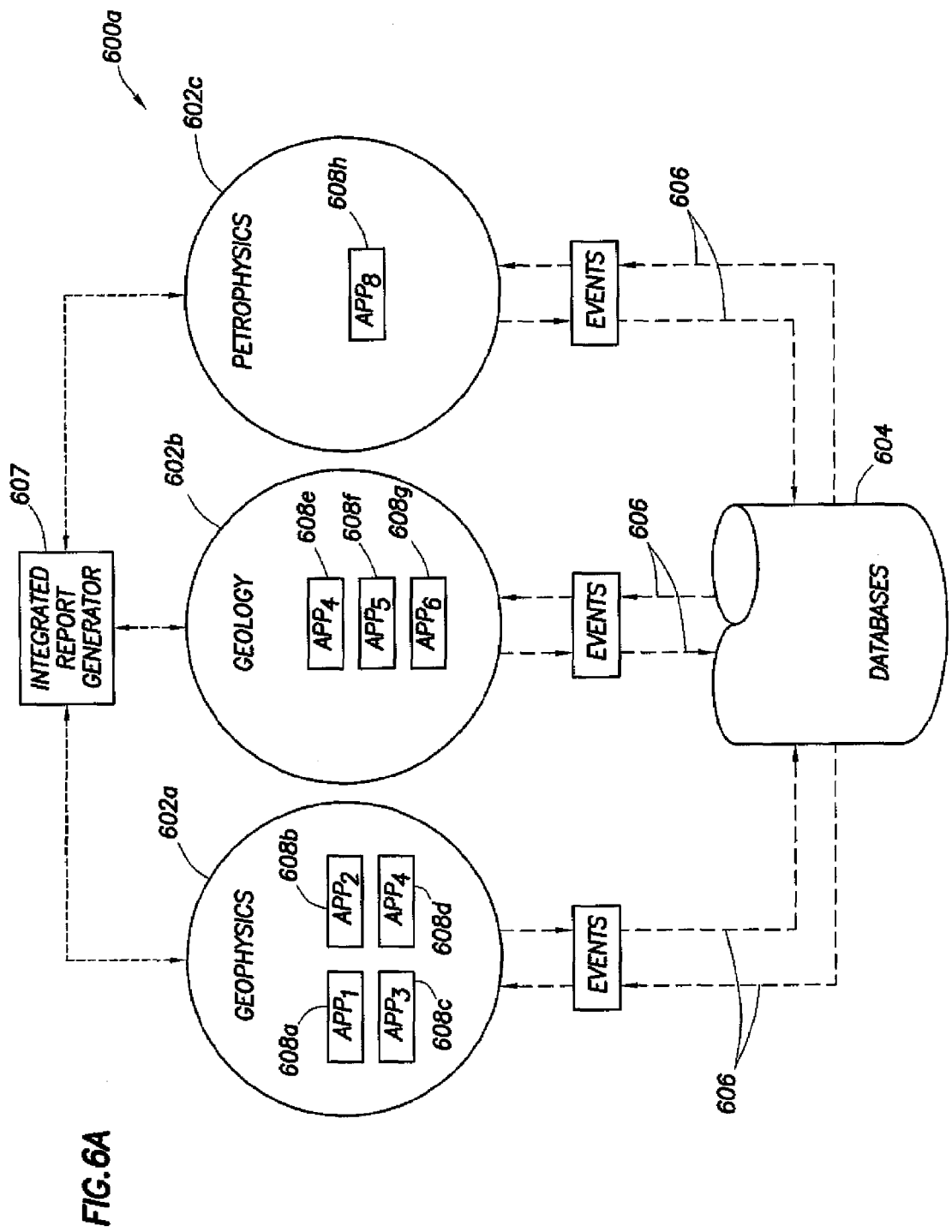
FIGS. 6A-B are schematic diagrams depicting independent systems for performing an oilfield operation.

FIGS. 6A-68 depict various systems for performing oilfield operations for an oilfield. These various systems describe various configurations that may be used to perform the oilfield operations. In each system, various modules are operatively connected to perform the desired operation(s).

Figure 6B:
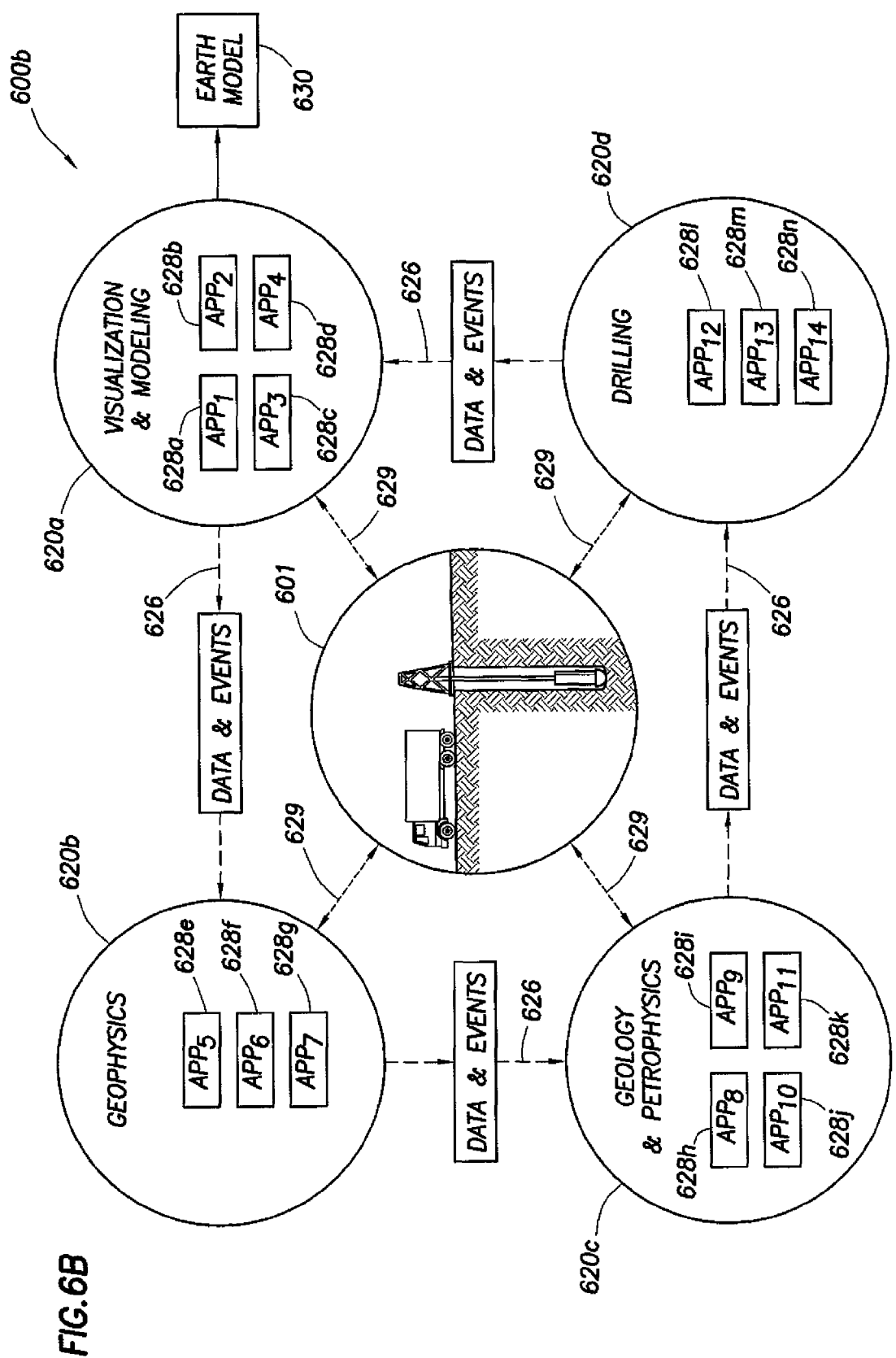

FIGS. 6A-6B are schematic diagrams depicting independent systems for performing an oilfield operation. As will be described below, the independent system has individual modules containing separate applications that are operatively connected to perform various modeling operations for an oilfield. FIG. 6A depicts an independent database system (600a) having separate applications and a common database. The database system includes oilfield modules (602a)-(602c) and shared database (604) with database connections (606) therebetween. The database system is also provided with an integrated report generator (607).

The oilfield modules as shown include geophysics module (602a) having applications (608a)-(608d) separately positioned therein, geology module (602b) having applications (608e-g) separately positioned therein and petrophysics module (602c) having application (608h) therein. Database connections (606) are positioned between each oilfield module and the shared database for passing events therebetween as depicted by the dashed arrows (606).

In this configuration, the individual modules may perform a modeling operation as previously described for the specific functions using separate applications to process the information. In this example, each module performs its modeling using separate applications and passes its events to the shared database. As used herein, an event is an activity marker indicating that something has happened, such as a user input (e.g. mouse click), a changed data value, a completed processing step, or a change in the information stored in the database (e.g., adding new measurements, performing a new analysis, or updating a model). Each module may access any event from the database and use such events as inputs into its separate modeling operation.

The geophysics module (602a) performs individual geophysical analysis of the oilfield. For example, the module may perform synthetic modeling of the seismic response based on the information generated from the log data collected from the logging tool (106b) of FIG. 1B.

The geology module (602b) performs individual geological analysis of the oilfield. For example, the module may perform modeling of the geological formations of the oilfield based on the information generated from the log data collected from the logging tool (106b) of FIG. 1B.

The petrophysics module (602c) performs individual petrophysical analysis of the oilfield. For example, the module may perform modeling of the rock and fluid responses based on the information generated from the log data collected from the logging tool (106b) of FIG. 1B.

Database connections (606) are depicted as dashed arrows positioned between the modules and databases. The database connections (606) enable the passage of events between each of the separate modules and the database. The separate modules may send and receive events from the shared database as indicated by the arrows. While the database connections are depicted as passing data from the database to a selected module, or vice versa, various connections may be positioned in the system to provide the passage of events between one or more databases, reports, modules or other components of the independent database system.

The integrated report generator (607) is used to provide information from the modules. The reports may be sent directly to the oilfield, offsite locations, clients, government agencies and/or others. The reports may be independently generated by any one or more of the modules or applications, or integrated for consolidated results prior to distribution. The format of the reports may be user defined and provided in any desired media, such as electronic, paper, displays or others. The reports may be used as input to other sources, such as spreadsheets. The reports may be analyzed, re-formatted, distributed, stored, displayed or otherwise manipulated as desired.

Preferably, the report generator may be capable of storing all aspects of the oilfield operation and/or the processing of information for the independent database system. The integrated report generator may automatically obtain information from the various modules and provide integrated reports of the combined information. The integrated report generator can also provide information about the modeling processes and how results were generated, for example in the form of a Sarbanes-Oxley audit trail. Preferably, the reports may be tailored to provide the desired output in the desired format. In some cases, such reports may be formatted to meet government or other third party requirements.

The database (604) houses data from the oilfield, as well as interpretation results and other information obtained from the module(s) (602a)-(602c). For example, description of a horizon element of the subterranean structure may be generated by one such module and stored in the database (604), which may include horizon name and x/y/z point set, interpretation person and date, modification date, geological age, etc. As used herein the term database refers to a storage facility or store for collecting data of any type, such as relational, flat or other. The database can be located remotely, locally or as desired. One or more individual databases may be used. While only one database is depicted, external and/or internal databases may be provided as desired. Security measures, such as firewalls, may be provided to selectively restrict access to certain data.

FIG. 6B depicts an independent process system (600b). This process system has separate applications, and is in communication with an oilfield. The process system includes oilfield modules (620a)-(620d) with process connections (626) therebetween for generating a combined earth model. Generally speaking, an earth model is a three dimensional (3D) geological representation of the physical earth in an area of interest. In this case, the combined earth model may be the same as the basic earth model of FIGS. 4A-C, except that the combined earth model is created using multiple modules connected via process connections to generate an earth model.

The oilfield modules as shown include a visualization & modeling module (620a) having applications (628a)-(628d) separately positioned therein, a geophysics module (620b) having applications (628e)-(628g) separately positioned therein, geology & petrophysics module (620c) having applications (628h)-(628k) separately positioned therein and drilling module (620d) having applications (628l)-(628n) separately positioned therein. Process connections (626) are positioned between each oilfield modules for passing data and events therebetween as depicted by the dashed arrows.

The geophysics module (620b) may be the same as the geophysics module (602a) of FIG. (6A). The geology & petrophysics module (620c) may perform the same functions as the geology module (602b) and petrophysics module (602c) of FIG. (6A), except the functions are merged into a single module. This demonstrates that various modules may be merged into a single module for combined functionality. This FIG. also depicts the ability to have modules defined with the desired functionality. One or more functions can be provided for the desired modules.

The drilling module (620d) performs modeling of a drilling operation of the oilfield. For example, the module may model drilling responses based on the information generated, for example from the drilling data collected from the logging tool of FIG. 1B.

The visualization & modeling module (620a) generates a combined earth model (630) based on the information collected from the other modules (620b-d). The combined earth model is similar to the basic earth model previously described with respect to FIGS. 4A-C, except that it provides an overall view of the oilfield operation based on a combined analysis provided by the various modules as depicted. This module may also be used to generate graphics, provide volumetrics, perform uncertainty assessments or other functions.

As shown, the independent process system enables each individual module to perform its individual modeling function and pass data and events generated therefrom to the next module. In this manner, modeling is performed by the separate applications in the visualization & modeling module, and data and events are passed to the geophysics module. The geophysics module performs its separate modeling using its separate applications, and passes data and events to the geology & petrophysics module. The geology & petrophysics module performs its modeling using its separate applications, and passes its data and events to the drilling module. The drilling module (620d) performs modeling of the drilling operation, and passes its data and events to the visualization & modeling module. The visualization and modeling module is then used to generate a combined earth model (630).

The process connections (626) are similar to the database connections (606) of FIG. 6A. In this case, the process connections provide a means for passing both data and events to the next module for use as an input to the next module in the modeling process. For example, the process connections may be implemented as message passing schemes via shared memory or via network connections. As depicted, the data flows in one direction through the independent process system. As will be described in greater detail below, the connections may be reconfigured to permit flow in multiple directions between desired modules.

As shown, the independent process system of FIG. 6B may be operatively connected via an oilfield connection (629) to an oilfield via oilfield inputs/outputs (601) for operation therewith. The oilfield may be the same as the oilfield (100) of FIGS. 1A-D or (300) of FIG. 3 previously described. Data from the oilfield may be transferred via the oilfield inputs/outputs directly into one or more of the modules. The results generated from the process system may be returned to the oilfield via the oilfield inputs/outputs for responsive action. A surface unit of the oilfield may receive the results and process the information. This information may be used to activate controls or send commands to equipment at the oilfield. Controls may be provided to actively adjust the oilfield operation in response to the commands. Automatic and/or manual controls may be activated based on the results. The results may be used to provide information to real-time operation at the oilfield. The data may also be applied to other oilfields for historical or comparative value.

Figure 7A:
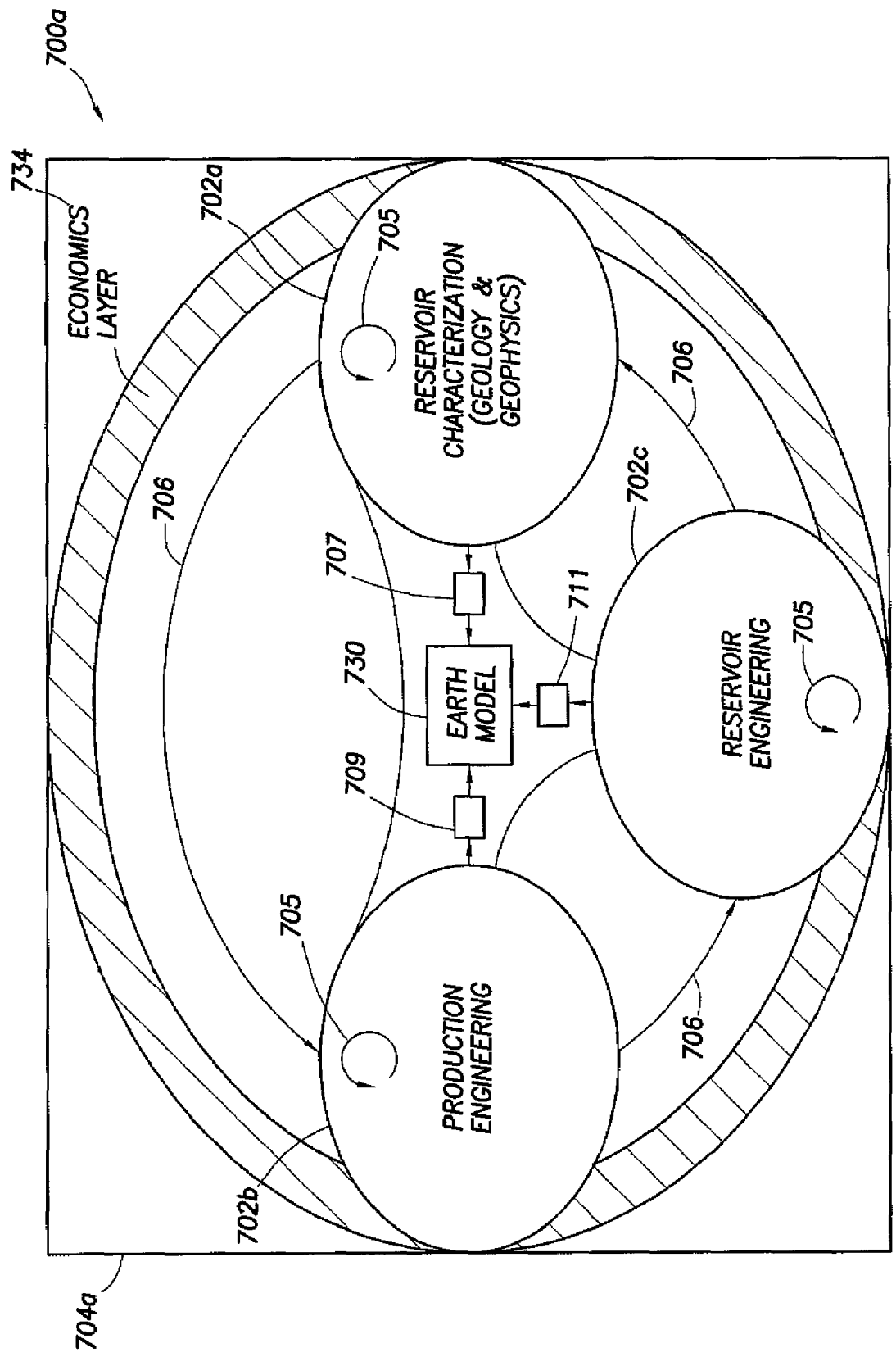
FIGS. 7A-B are schematic diagrams depicting integrated systems for performing an oilfield operation.
Figure 7B:
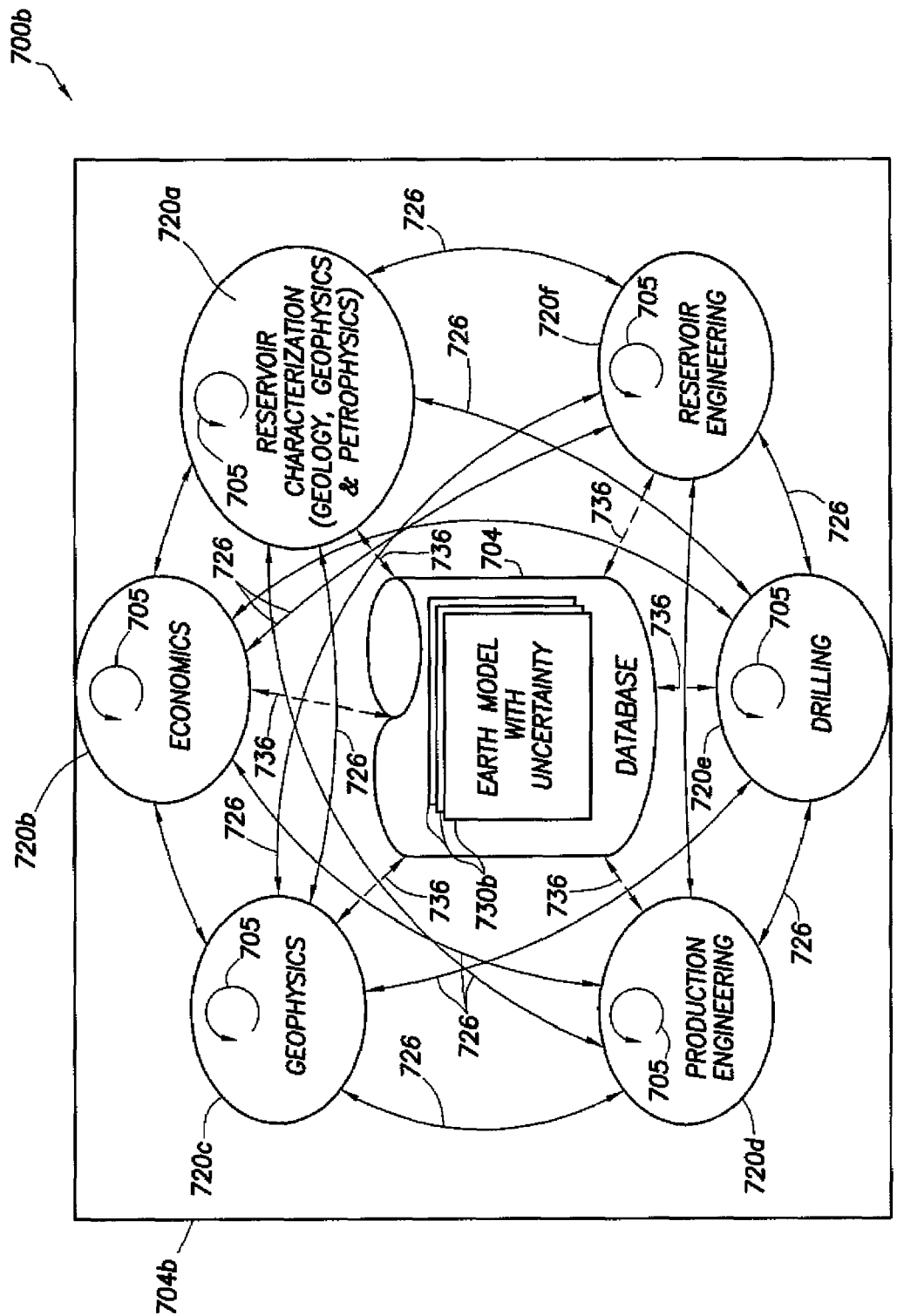

FIGS. 7A-B are schematic diagrams depicting integrated systems for performing an oilfield operation. As will be described below, the integrated system has modules positioned within a single application to perform various modeling operations for an oilfield. FIG. 7A depicts a uni-directional integrated system (700a) for performing oilfield operations. The uni-directional integrated system has a plurality of oilfield modules (702a)-(702c) positioned in the same application (704a) with an economics layer (734) positioned about the modules. In this case, the modules are within a single application and, therefore, share data and events to generate an oilfield model, such as shared earth model (730a). The shared earth model of FIG. 7A may be the same as the basic earth model of FIGS. 4A-4C or the combined earth model of FIG. 6B, except that the model is created by modules connected via uni-directional module connections in a single application where the uni-directional model connections are based on communication facilities provided within the single application environment.

As depicted in FIG. 7A, each module is operatively connected within the application via uni-directional model connections (706) to perform modeling according to a one-way sequence in the system. In other words, the reservoir characterization module performs its modeling, then the production engineering performs its modeling and finally the reservoir engineering module performs its modeling to generate a shared earth model. The unidirectional model connections are depicted as arrows denoting the one-way flow of the modeling process as the operation is being performed by the various modules.

The uni-directional integrated system (700a) permits the modules to sit (i.e., incorporated or positioned) within one application so that data and events may be shared without the requirement of a connection for passage therebetween as shown, e.g., by database connections (606) of FIG. 6A or message passing connections (626) of FIG. 6B. The modules are positioned in the same space (i.e., loaded in the same memory space and having access to the same data files where the memory space and data files are allocated for the application (704a) opened in an operating system environment (not shown)) and have the ability to view the operation of the other modules on the shared earth model. In this configuration, the various modules can participate in the modeling operation of the entire system thereby permitting an integrated view and integrated operation of the modeling process.

The reservoir characterization module (702a) as depicted performs both geology and geophysics functions, such as those used by as modules (602a) and (602b) (FIG. 6A) previously described. As shown here, the functionality of multiple modules may be merged into a single module within the application (704a) for performing the desired functions. The merging of functionalities into a single module may enable additional and/or synergistic functionality. As shown here, the reservoir characterization module is capable of performing geostatistic and other property distribution techniques. The reservoir characterization module having multiple functionality permits multiple workflows to be performed in a single module. Similar capabilities may be generated by merging other modules, such as the geology & petrophysics module (620dc) of FIG. 6B. The reservoir characterization module performs its modeling operation and generates a static earth model (707).

The circular arrow (705) depicts the ability of the reservoir characterization module to perform iterations of the workflows to generate a converged solution. Generally speaking, a workflow may include multiple action steps executed in a pre-determined order to perform the oilfield operation associated with a project, for example reservoir characterization. Each module is provided with convergence capabilities so that they may repeat the modeling process as desired until a certain criteria, such as time, quality, output or other requirement, is met.

Once the reservoir characterization has performed its modeling operation, the process may be advanced as depicted by curved arrow (706) so that the production engineering module may perform its modeling operation. The production engineering module (702b) is similar to the modules previously described except that it is used to perform production data analysis and/or modeling, for example using the production data collected from the production tool (106d) of FIG. 1D. This involves an analysis of the production operation from removal of fluids from the reservoir, to transport, to surface facilities as defined by the user. The circular arrow (705) depicts the ability of the production module to perform iterations of the workflows to generate a converged solution as previously described. The production module performs its modeling operation and generates a production historical analysis (709).

Once the production engineering module has performed its modeling operation, the process may be advanced as depicted by curved arrow (706) so that the reservoir engineering module may perform its modeling operation. The reservoir engineering module (702c) is similar to the modules previously described except that it is used to perform reservoir engineering/dynamic data analysis and/or modeling. This involves an analysis of the subterranean reservoir, for example using the production data collected from the production tool (106d) of FIG. 1D. The circular arrow (705) depicts the ability of the reservoir module to perform iterations of the workflows to generate a converged solution as previously described. The resulting solution may then be passed to the reservoir characterization module as depicted by curved arrow (706). The reservoir engineering module generates a dynamic (or predictive) earth model (711).

As indicated by the curved arrows (706), the process may be continuously repeated as desired. The static earth model (707), the production historical analysis (709) and the dynamic model (711) are combined to generate a shared earth model (730a). For example the static earth model (707) and the dynamic model (711) may be combined by matching to the production historical analysis (709) as described with respect to FIG. 4A-5 above. This shared earth model may be refined over time as new data is passed through the system, as new workflows are implemented in the analysis and/or as new interpretation hypotheses are input into the system. The process may be repeated and the outputs of each module refined as desired.

The system is also provided with economics layer (734) for providing economics information concerning the oilfield operation. The economics layer provides capabilities for performing economics analysis and/or modeling based on inputs provided by the system. The modules may provide data to and/or receive data from the economics layer. As depicted, the economics layer is positioned in a ring about the system. This configuration demonstrates that the economics may be performed at any time or during any process throughout the system. The economics information may be input at any time and queried by any of the modules. The economics module provides an economic analysis of any of the other workflows throughout the system.

With the layer configuration, economics constraints may provide a pervasive criterion that propagates throughout the system. Preferably, this configuration allows the criteria to be established without the requirement of passing data and events to individual modules. The economics layer may provide information helpful in determining the desired shared earth model and may be considered as desired. If desired, warnings, alerts or constraints may be placed on the shared earth model and/or underlying processes to enable adjustment of the processes.

FIG. 7B depicts a bidirectional integrated system (700b). In this configuration, the modules are provided with an internal database and generate an integrated earth model. The bidirectional integrated system (700b) has a plurality of oilfield modules (720a)-(720f) positioned in the same application (704b). In other words, the oilfield modules (720a)-(720f) are loaded in memory space and having access to data files where memory space and data file access are allocated and provided for the application (704b) opened in an operating system environment (not shown)). These modules include reservoir characterization module (720a), an economic module (720b), a geophysics module (720c), a production engineering module (720d), a drilling module (720e), and a reservoir engineering module (720f). In this case, the modules are connected by bidirectional curved arrows (726). As depicted the modules are provided with convergence capabilities as depicted by circular arrow (705). One or more of the modules may be provided with such convergence capabilities as previously described with respect to FIG. 7A.

The modules (720a)-(720f) may be the same as the modules previously described, except that they are provided with the functionality as desired. For example, geophysics module (720c), production engineering module (720d), reservoir engineering module (720f) and drilling module (720e) may be the same as modules (620b), (702b), (702c) and (620d) respectively.

Reservoir characterization module (720a) may be the same as reservoir characterization module (702a), except this version is further provided with petrophysics capabilities. As shown, the reservoir characterization module contains geology, geophysics and petrophysics capabilities. The geologist along with the geophysicist and the petrophysicist may make multiple static model realizations in one module based upon available seismic and well measurements, referenced to known model analogues for the region. Such known data typically has high accuracy at the wells and less reliable location positioning for the seismic data. Physical rock and fluid properties can typically be accurately measured at the well locations, while the seismic can typically be used to grossly represent the changing reservoir formation characteristics between the well locations. Various data interpretation methodologies and model property distribution techniques may be applied to give as accurate a representation as possible. However, there may be numerous methods for interpretation and model creation that directly affect the model's real representation of the reservoir. A given methodology may not always be more accurate than another.

In this version, economics is provided via economics module (720b), rather that a layer (734) as depicted in FIG. 7A. The economics module in this case demonstrates that the economics functionality may be provided in a module form and connected with other modules.

As with the case depicted in FIG. 7A, the models are positioned within a single application and, therefore, share data and events to generate an integrated earth model 730b. In this case, a plurality of integrated earth models (730b) is generated by each module in a bidirectional sequence through the system. In other words, the selected module(s) (e.g. reservoir characterization, economics, geophysics, production engineering, drilling and/or reservoir engineering) may each perform their modeling in sequence to generate an integrated earth model. The process may be repeated to generate additional integrated earth models. As depicted by the bi-directional arrows (726), the process may be reversed, repeated and performed in any order throughout the bi-directional integrated system.

The modules of FIG. 7B are operatively connected via bi-directional module connections as depicted by curved arrows (726) to each of the other modules, for example in a star configuration of point to point connections. This configuration demonstrates that certain modules may be selectively connected to perform the desired modeling operations in the desired sequence. In this manner, a selected module may directly interact (e.g., passing data and/or event) with any other selected module(s) as desired. While multiple connections are depicted as providing a connection with each other module, a variety of configurations may be used to establish the connected network as desired, for example a leg of the star configuration may be omitted to form a partial star configuration. This provides a flexible connecting system for selectively defining the modules to perform the desired modeling operation.

The integrated earth model (730b) is created from contributions from the selected modules. As described previously, the reservoir characterization module may be used to generate a static model, the production engineering module may be used to generate historical information, and the reservoir engineer may be used to generate the dynamic model. The geophysics module may be used to generate the basic configuration of the model. The economics module may be used to define the business or economic viability of the integrated earth model. The drilling module may be used to determine the optimized position of new drilling locations or re-completions of existing wells. Other modules may be added to the system with additional connections to provide data and events accessible by other modules and/or to contribute to creating the overall integrated earth model.

The integrated earth model is generated by selectively combining the contributions from the selected modules. For example, a user may open the application and select from modules positioned in the application for performing multi-disciplinary (or multi-domain) modeling where an event such as a change in a component (e.g., a horizon) of the shared earth model generated from workflow iterations in one of the selected modules may cause a message and/or information regarding the changed component to be sent or otherwise communicated to all other selected modules via connections (726). The change may be as a result of change in input data, interpretation algorithm and/or parameters, etc. The message and/or information regarding the changed component may then be utilized to re-run workflows in the respective other selected modules receiving the communicated change.

In one or more embodiments of the invention, the communication of the change and/or the decision to re-run workflows in modules receiving the communicated change may be based on user decision (or activation) to update the results of the workflows. In such embodiments, communication of the message and/or information regarding the changed component via connections (726) allows cooperation among these selected modules in modeling the oilfield. In such embodiments, connections (726) are called integrated connections as these selected modules cooperate with each other as integrated components of a single application. In one or more embodiments of the invention, information communicated via the integrated connections (726) regarding the changed component may include oilfield knowledge, such as process information describing the modeling performed by the oilfield module that generates the change. Such process information may be utilized for repeatability and ability to reverse the change by the modules sending and/or receiving the communicated information. More details regarding the oilfield knowledge and process information are described below.

In FIG. 7B, the system is provided with a database (704). As shown, the database is positioned within the application for access by each of the modules. A database connection (736) is provided for the passage of data and/or events therebetween. The database may be the same as database (604) of FIG. 6A with the exception of facilities to manage oilfield knowledge described below. In addition to the raw data and interpretation results housed in database (604), the database (704) may also be provided with knowledge (i.e., oilfield knowledge), for example a record of the process which generated the end results (e.g., algorithm selection in a module, parameter selection for the algorithm, the order in which a workflow is arranged to derive the end results, etc.), the inter-dependencies between the modules that were used during the analysis, user information (e.g. data quality tags, comments, etc.) as well as any other desired information or processes. For example, in addition to horizon name and x/y/x point set, interpretation person and date, modification date, geological date, etc., additional knowledge regarding the horizon may also be stored in the database (704), such as input source of raw data (e.g., well picks, 2D seismic pick, 3D seismic pick, manually defined point, etc.), interpretation algorithm (e.g., convergent gridder, kriging, interpolation, etc.) and parameters used to create horizon from the input source, relationship with other horizons in the earth model for zone definition, relationship with other faults in the earth model for structural framework definition, etc.). In some example, there may be over 400 parameters included in the horizon knowledge. This provides the ability to record how an integrated earth model was generated, and to keep a record of other input relating to the process. This also permits the selective storage, replay and/or reuse of various portions of the process used by the system, knowledge capture and scenario planning and testing by one or more users of the application (704b) where each user may have one or more modules selected and opened for modeling in a domain specific to the respective user. In one or more embodiments of the invention, such multi-user domain specific modeling may be performed concurrently with revision control of change in any portion of the earth model (730b) in the database (704) managed using a check-in/check-out process via database connections (736) for each module in the application (704b). In one or more embodiments of the invention, the knowledge described above may be represented, stored, communicated, or utilized as metadata (i.e., data about data or model) associated with oilfield data and models described with respect to FIGS. 2A-2D and 4A-4C above.

In addition, the flexibility of the system permits the user to pre-define, adjust and/or otherwise manipulate the configuration of the modeling process as well as the resulting integrated earth models. The system permits the creation of multiple integrated earth models based on uncertainties inherent to the system. The uncertainties may be, for example, inaccuracies in the raw data, the assumptions of the algorithms, the ability of the models to accurately represent the integrated earth model and others. The system may be operated using multiple variables and/or scenarios to generate multiple integrated earth models. The output of multiple integrated earth models based on various methods used to perform multiple versions of the modeling process is often referred as multiple realizations. The generated integrated earth model is, therefore, said to be provided with uncertainties.

Figure 8:
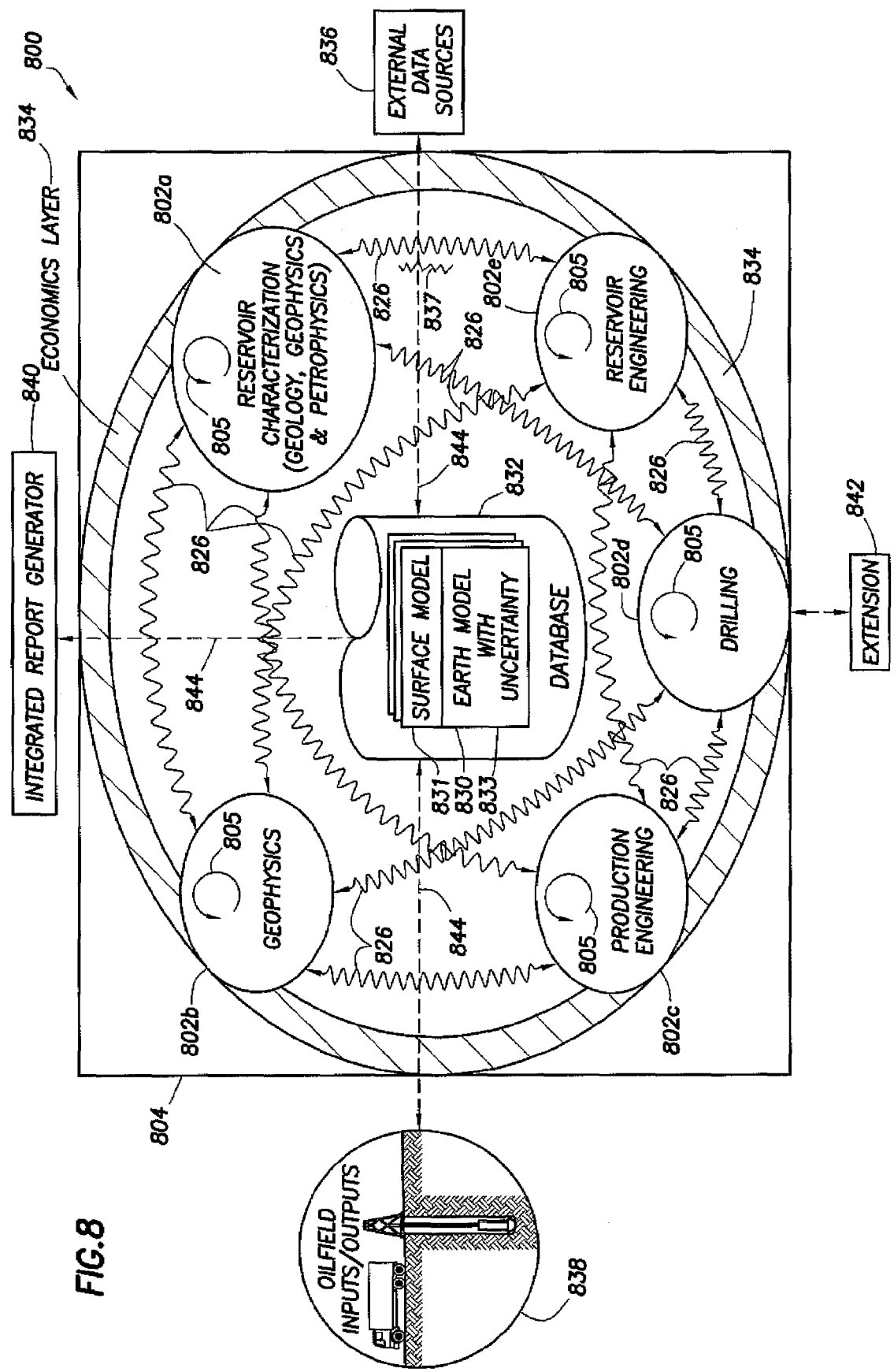
FIG. 8 depicts a unified system for performing an oilfield operation, the unified system having a plurality of dynamically connected oilfield modules generating a unified earth model, the unified system provided with a shared database, oilfield inputs/outputs, an extension and an economics layer.

FIG. 8 depicts a unified system (800) for performing an oilfield operation. As will be described below, the unified system has modules positioned within an application and dynamically connected to perform the oilfield operations. FIG. 8 provides a unified system of modules connected by dynamic connections and having functionality similar to the reports (607) of FIG. 6A, the real-time functionality of FIG. 6B, the economics layer (734) of FIG. 7A and the database (704) of FIG. 7B.

The unified system has a plurality of oilfield modules (802a)-(802e), an internal database (832), an economics layer (834), external data source (836), oilfield inputs/outputs (838) and integrated report generator (840). The modules (802a)-(802e) may be the same as the modules previously described, except that they are provided with additional functionally as desired. For example, reservoir engineering module (802a), geophysics module (802b), production engineering module (802c), drilling module (802d) and reservoir engineering module (802e) may be the same as modules (720a), (720c), (720d), (720e) and (720f), respectively, of FIG. 7B. These modules may optionally be provided with convergence capabilities (805) similar to those depicted in FIGS. 7A-7B by circular arrow (705). In this case, the economics functions are provided by economics layer (834), with similar capabilities as described with respect to the economics layer (734) of FIG. 7A. However, it will be appreciated that the economics functions may alternative or additionally be provided by, for example, an economics module (720b) of FIG. 7B.

The oilfield modules (802a)-(802e) are positioned in the same application (804) as previously described with respect to the modules of FIGS. 7A and 7B. In this case, the models are within a single application and, therefore, share data and events to generate oilfield models (830). The external data source(s) (836), oilfield inputs/outputs (838) and report generator (840) are connected to the database (832) via database connections (844). Other components (e.g., modules) may also be operatively connected to the database. Database connections from oilfield modules (802*a*)-(802*e*) to the database (832) are omitted from FIG. 8 for clarity. Data may be selectively exchanged between the components as desired. Safeties (837), such as firewalls, restricted access or other security measures, may be provided to restrict access to data as desired.

The modules may be connected to the database (832) to access and/or receive information (e.g., oilfield data of FIGS. 2A-2D, models of FIGS. 4A-4C, oilfield knowledge of FIG. 7B, etc.) as desired. The database (832) may be the same as database (704) of FIG. 7B and may allow one or more users for concurrent modeling of the oilfield. The database (832) may be the same as database (604) of FIG. 6A with the exception of additional facility to manage oilfield knowledge. Furthermore, the database (832) may be provided with one or more external databases, such as data sources (836) connected to database (832). Such external data source(s) may be libraries, client databases, government repositories or other sources of information that may be connected to the internal database. The external databases may be selectively connected and/or accessed to provide the desired data. Optionally, data may also be provided from the internal database to the external database as desired. Such data may be in the form of reports provided to outside sources via the external database.

The system of FIG. 8 is depicted as an open system that permits the addition of an extension (842) to add external functionality. As shown, the extension (or plug-in) (842) is connected to the drilling module (802*d*) to add, for example, a casing design module (842). The casing design module adds functionality to the drilling module. For example, the extension may allow the drilling module to consider casing design in generating its drilling design for the earth model. Such extensions may be added using existing products, such as OCEAN™ Development Kit by SCHLUMBERGER™. One or more additional extensions may be provided to any of the modules in the system. Additionally, the system may be expanded to add entire modules within the system.

The oilfield inputs/outputs as depicted by (838) may be the same as the oilfield inputs/outputs (601) described with respect to FIG. 6B, except that the oilfield inputs/outputs (838) communicates with database (832) via database connection (844). In this manner, data from the oilfield (e.g., of FIG. 2A-2D) may be fed into the database so that modeling operation may be updated with the new information as it is received, or at various intervals as desired. Optionally, the oilfield inputs/outputs may be or connected to one or more modules, databases or other components of the system.

The report generator (840) may be the same as the report generator (607) depicted in FIG. 6A, except that the report generator is now connected to internal database (832), rather than individual modules. Reports may be distributed to the oilfield, external database or other external locations as desired via database (832). Reports may also be directly provided by the Reports generator to the desired internal and/or external locations. Reports may be provided in the desired format, for example to third parties via external database (836), as desired.

The process used to create the oilfield model (e.g., by any of the modules (802*a*)-(802*e*)) may be captured (e.g., as knowledge metadata) and provided as part of the reports. Such process reports may be provided to describe how the oilfield models were generated. Other data or results may also be provided. For example, a report may provide a final volumetric generated by the system. Additionally, the report may also include a statement of the calculated uncertainties, the selected sequence of processes that comprise the oilfield model, the dates operations were performed and decisions made along the way.

The modules are operatively connected by wavy arrows (826) depicting dynamic connections therebetween. While a specific configuration of modules is depicted in a specific order, it will be appreciated that a variety of connections, orders or modules may be used. This flexibility provides for designed modeling configurations that may be performed to defined specifications. Various combinations of modules may be selectively connected to perform the desired modeling. The various oilfield models generated by the various combinations of modules may be compared to determine the optimum process for performing the oilfield operations.

The wavy arrows (826) depict the process flow and knowledge sharing between the modules. Two or more of the individual modules may be operatively connected to share knowledge and cooperatively perform modeling. As shown, the connections are dynamic (i.e., oilfield knowledge may be communicated automatically or in real-time without user activation or other forms of intervention) to enable unified operation (e.g., cooperative modeling with knowledge sharing without user intervention), rather than just the independent operation of FIGS. 6A-6B without knowledge sharing or the integrated operation of FIGS. 7A-7B with user activated knowledge sharing. This dynamic connection between the modules permits the modules to selectively decide whether to take action based on modeling performed by another module. If selected, the module may use the dynamic connection to rerun a process (or a workflow) based on updated information received from one or more of the other modules. When modules are dynamically connected, they form a network that enables the knowledge capture from dynamically connected modules and allows selective processing by the modules based on the knowledge sharing of the modules. A unified earth model may be generated based on the combined knowledge of the modules.

By way of example, when data is received indicating a change (e.g. a property in an earth model or a control setting), that change and associated oilfield knowledge is automatically propagated to all modules that are dynamically connected. The dynamically connected modules share this knowledge and perform their modeling based on the new information. The dynamic connections may be configured to permit automatic and/or manual updates to the modeling process. The dynamic connections may also be configured to permit changes and/or operational executions to be performed automatically when an event occurs that indicates new settings or new measurements are available. As queries are made to the oilfield model, or data changes such as additions, deletions and/or updates to the oilfield model occur, the dynamically connected models may perform modeling in response thereto. The modules share knowledge and work together to generate the oilfield models based on that shared knowledge.

The dynamic connections may be used to participate in the knowledge capture, and may be configured to enable automated modeling between the modules. The configuration of the connections may be tailored to provide the desired operation. The process may be repeated as desired so that the knowledge sharing and/or modeling is triggered by predefined events and/or criteria. As depicted, the dynamic connections have bidirectional flow between the selected modules. This permits the modeling operation to be performed in a desired sequence, forward or backwards. The dynamic connections are further provided with the capability of simultaneously performing the modeling operation.

For example, observations at a prediction stage of the dynamic modeling may affect parameterization and process selections further up the chain. In this example, predictive volumetrics of a model generated by a module may not match historical data thereby requiring changes to the model's conditions that create a large fluid volume. These suggested changes may point to any number of parameters that could result in a desired change effect.

Knowledge sharing between the modules may involve, for example, viewing the modeling operation from another module. The modules may work together to generate the oilfield modules based on a common understanding of knowledge content and interactive processing responsive to change indication conveyed by the knowledge. Knowledge sharing may also involve the selective sharing of data from various aspects of the oilfield. For example, the reservoir engineer may now consider seismic data typically reviewed by the geophysicist, and the geologist may now consider production data typically used by the reservoir engineer. Other combinations may be envisioned. In some cases, users may provide inputs, set constraints, or otherwise manipulate the selection of data and/or outputs that are shared between the selected functions. In this manner, the data and modeling operations may be manipulated to provide results tailored to specific oilfield applications or conditions.

The modules may be selectively activated to generate a unified oilfield model (830). The unified oilfield model may contain, for example, a unified earth model (833). The unified earth model (833) may be the same as the earth model (730*b*) previously described in FIG. 7B, except, for example that it is generated by the modules dynamically connected for automatic knowledge sharing instead of user activated knowledge sharing. The oilfield model may further provide other model features, such as a surface model (831). In this case, the production engineer module, for example, may have additional information concerning the surface facility, gathering networks, storage facilities and other surface components which affect the oilfield operation. The production engineering and (optionally) other modules may use this data to generate a unified surface model. The surface model may define, for example, the mechanical facilities necessary for the production and distribution of the subsurface reservoir, such as the gathering networks, storage facilities, valves and other surface production facilities. Thus, the selected modules may be used to generate a unified oilfield model based on the combined earth and surface models, or other desired model generated by activation of the selected modules.

To optimize modeling outputs, it may be possible to leverage data and other information from one or more of the modules. For example, the reservoir engineering data relating to dynamic fluid production may be used to enhance the oilfield model by simulating how the measured fluids will flow through the various models. How accurately each model's flow simulation matches the known historical production measurements may be observed and measured. Typically, the better the history production simulation match, the higher likelihood there will be of a future production match. A more accurate future match may be required for planning expenditures on well recompletions, drilling of new wells, modifying surface facilities, or planning economic recoverable hydrocarbons.

In another example, the relationship between the static and dynamic portions of the reservoir characterization module may be leveraged to optimize the oilfield model. The reservoir characterization module may have a static and dynamic model that provides the best historical match of a reservoir's production. No matter how good the match, the model may require recalibration over the course of time as more wells are drilled, or new production information is acquired. If newly observed data no longer matches the static model, then it may be necessary to update the static model to more accurately predict the future. In cases where a well's measured production rate is suddenly less than predicted, this can be an indication that the reservoir compartment is not as large as once thought. Based upon this production observation the reservoir engineer can query the geologist to investigate and update to the model's porosity, or query the geophysicist to see whether the initial ceiling height of the formation boundaries may be overly optimistic and in need of revising downward. The updates provided may be used to facilitate knowledge refinement, and enable reverse processing to update the oilfield model.

Figure 9A:
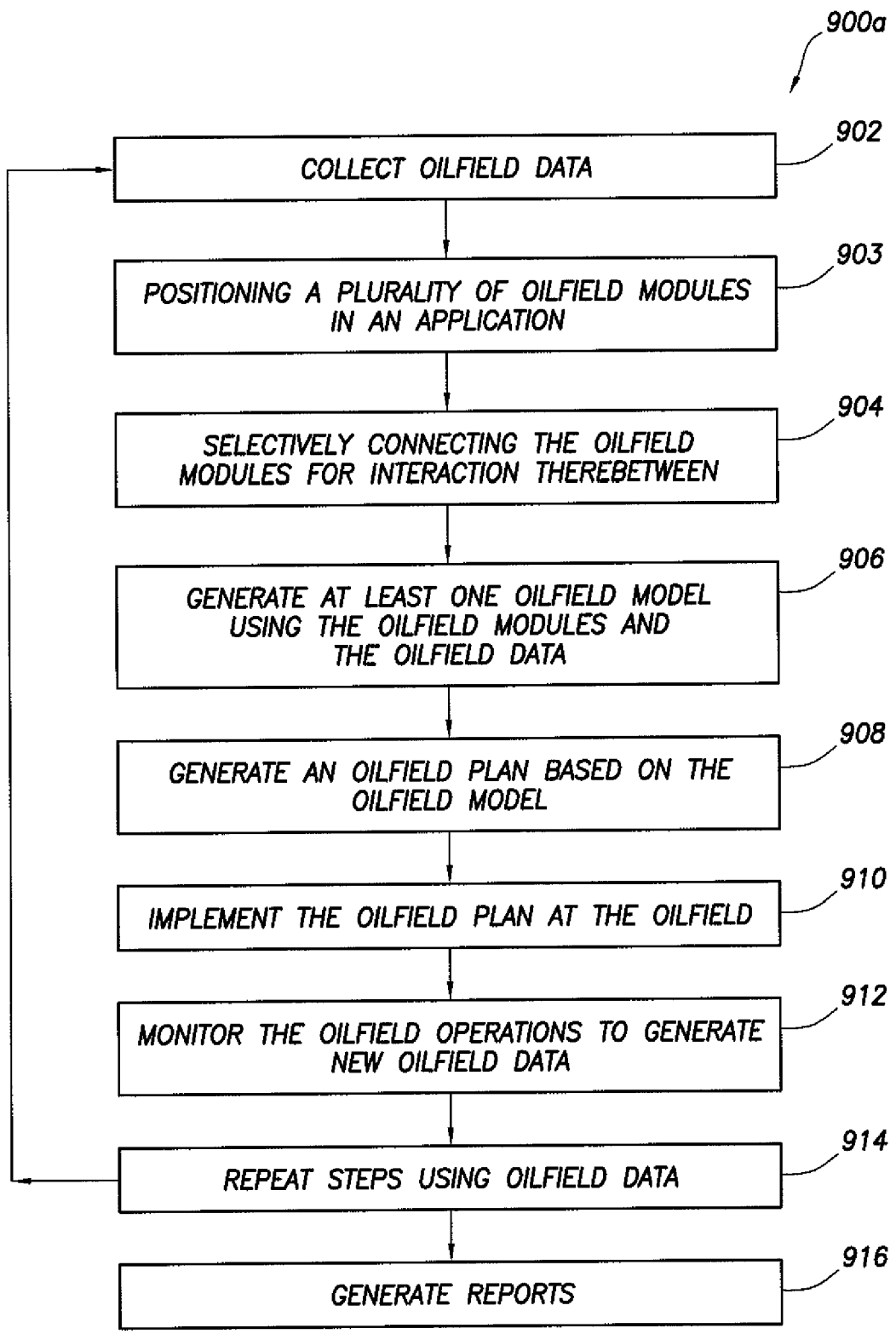
FIGS. 9A and 9B are flow charts depicting methods of performing oilfield operations.
Figure 9B:
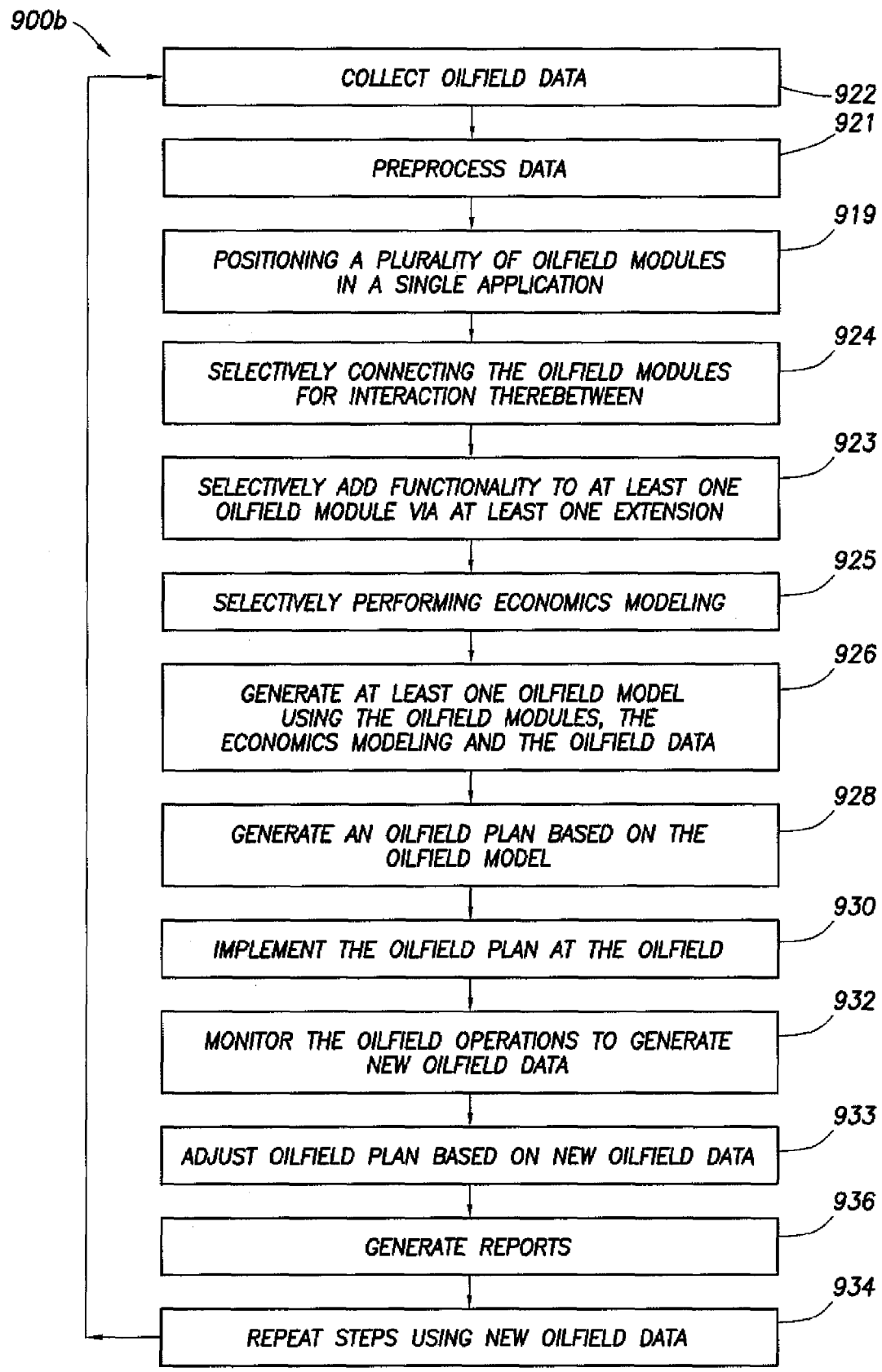

FIGS. 9A and 9B are flow charts depicting methods of performing an oilfield operation. FIG. 9A depicts a method (900*a*) for performing an oilfield operation involving collecting oilfield data (Step 902), positioning a plurality of oilfield modules in a single application (Step 903), selectively connecting the oilfield modules for interaction therebetween (Step 904), and generating oilfield model(s) using the oilfield modules and the oilfield data (Step 906).

The data may be collected in one or more databases (Step 902). As shown in FIG. 8, the databases may be internal database (see, e.g., database (832) of FIG. 8) and/or an external database (see, e.g., database (836) of FIG. 8). The collection of oilfield data may be performed as described previously. Data may be collected at various times, and the models generated throughout the process may be selectively updated as new data is received. Constraints may be placed on the collection of data to selectively restrict the type, quantity, flow or other characteristics of the incoming data to facilitate processing. Optionally, the data may be collected and/or displayed in real time. The data and/or models may be selectively stored in databases at various intervals throughout the analysis. The process performed throughout the method may also be stored. A trail depicting the process is created, and may be replayed at specific intervals as desired. The various inputs, outputs and/or decisions made throughout the process may be viewed. Snapshots of the analysis may be selectively replayed. If desired, the process may be re-performed using the same or other data. The process may be adjusted and re-stored for future use. Reports of stored data, models and/or other information contained in the database may be provided, for example, by the report generator (840) of FIG. 8.

The plurality of oilfield modules is positioned in an application (Step 903) as shown, for example, in FIG. 8. When placed in the same application as shown in FIGS. 7A-8, the modules are able to share data and events without the requirement of passing them from one application to the other as shown in FIGS. 6A and 6B. The modules are also able to see the modeling operation performed by the other modules. In some cases, it may be desirable to access modules positioned in separate applications (not shown). For example, the system of FIG. 7A may be operatively connected to the system of FIG. 6B using a system connection to pass data and events therebetween. This may be desirable in situations where modeling of oilfield data is performed by two separate systems. The models generated by the separate systems may be combined to generate one or more common earth models based on both systems. Modeling may, therefore, be performed across multiple applications with a system connection therebetween.

The oilfield modules are selectively connected (Step 904) for interaction therebetween. The modules may be connected, for example, by dynamically connections for unified operation (e.g. FIG. 8), integrated connections for integrated operation (e.g. FIG. 7B), module connections for shared operation (e.g. FIG. 7A), and/or database or module connections for passing data and/or events therebetween (e.g., FIG. 6A, 6B). Each of the modules is capable of performing modeling operations relating to the oilfield. In some cases, the modules work independently (FIGS. 6A-6B), are integrated for integrated operation (FIGS. 7A-7B) or are unified for shared knowledge and unified operation (FIG. 8). One or more of the modules may be selected to perform the desired operation. For example, a unified earth model 833 may be generated using only the reservoir characterization, geophysics and reservoir engineering modules (802*a*), (802*b*), (802*e*) operatively connected using, for example, the dynamic connections (826) of FIG. 8. Other configurations of selected modules may be connected using one or more selected connections to generate the desired model(s). The selective connecting of the modules permits flexible design for the selective interaction between the modules.

The desired modeling of the data is preferably performed by selectively performing modeling of various functions, such as those depicted in FIG. 8. This may be done by selecting oilfield modules for generating models based on a desired result. By way of example, certain models, such as the static models of FIGS. 4A-4C, may be generated. These static models are generated using, for example, the reservoir characterization (720*a*) and geophysics modules (720*c*) operatively connected by integrated connections (726) as shown in FIG. 7B to model a portion of the oilfield data relating to static data used by the geologist and/or geophysicist functions. Other combinations of modules may be used to generate models generated relating to specific portions of the oilfield. The method permits the selection of a variety of modules to generate models for use in the integrated analysis. Depending on the combination of modules, the resulting models may be used to generate output relating to any portion or the entire oilfield.

An oilfield model, such as the oilfield model (830) of FIG. 8, is generated by selectively performing modeling using the connected oilfield modules (Step 906). As described with respect to FIG. 8, the selected modules may work together to generate the oilfield model using the knowledge sharing of the data, events and models generated within the application. The modeling may also be performed using the integrated systems of FIG. 7A-7B, the independent systems of FIGS. 6A-6B or others. The oilfield model may be an earth model and/or other model, such as a surface model as described with respect to FIG. 8. Oilfield data may be selectively accessed by the oilfield models as desired, such as continuously, discretely or in real time, to generate and/or update models. The modeling process may be performed iteratively, until a predetermined criteria is met (e.g. time) or until convergence is achieved. Multiple oilfield models may be generated, and some or all may be discarded, compared, analyzed and/or refined. The multiple oilfield models preferably provide uncertainties as previously described with respect to FIG. 7B.

Preferably, an optimized oilfield model is generated that maximizes all predetermined criteria and/or objectives of the oilfield operation. An optimum oilfield model may be generated by repeating the process until a desired model is generated. Selected models may be operatively connected to generate models using certain data in a certain workflow. The process and configuration of the operation may be adjusted, repeated and analyzed. Multiple models may be generated, compared and refined until a desired result is achieved. The process used to generate the desired oilfield model may be refined to define an optimum process for a given scenario. The selected connection of certain modules may be combined to perform the desired operation according to the optimum process. Once an optimum process is determined, it may be stored in the database and accessed for future use. The optimum process may be adapted for certain situations, or refined over time.

An oilfield plan may be generated based on the generated oilfield model (Step 908). In some cases, an oilfield plan may include a design of part or all of the oilfield operation. The oilfield plan may define the requirements for performing various oilfield operations, such as drilling, well placement, well completions, well stimulations, etc. The generated oilfield models may predict, for example, the location of valuable reservoirs, or obstacles to obtaining fluids from such reservoirs. The models may also take into consideration other factors, such as economics or risks that may affect the plan. The oilfield plan is preferably optimized based on the generated oilfield model(s) to provide a best course of action for performing the oilfield operations.

The oilfield plan may be generated by the system (e.g. (800) of FIG. 8). Alternatively, the oilfield models generated by the system may be passed to a processor, for example in the surface unit ((134) of FIGS. 1B-1D). The processor may be used to generate the oilfield plan based on the generated oilfield models.

The oilfield plan may be implemented at the oilfield (Step 910). The oilfield plan may be used to make decisions relating to the oilfield operation. The oilfield plan may also be used to take action at the oilfield. For example, the oilfield plan may be implemented by activating controls at the wellsite to adjust the oilfield operation. The oilfield models, plans and other information generated by the system (e.g. (800) of FIG. 8) may be communicated to the oilfield via the oilfield inputs/outputs (838). The surface unit ((134) of FIGS. 1B-1D) may receive the information and perform activities in response thereto. In some cases, the surface unit may further process the information to define commands to be performed at the wellsite. Actions, such as changes in equipment, operating settings, trajectories, etc., may be performed at the wellsite in response to the commands. Such actions may be performed manually or automatically. The well plan may also be implemented by the surface unit by communicating with controllers at the wellsite to actuate oilfield equipment to take action as desired. In some cases, oilfield actions, such as drilling a new well, or terminating production may also be performed.

The oilfield operations may be monitored to generate new oilfield data (Step 912). Sensors may be located at the oilfield as shown in FIGS. 1A-1D. Information from the oilfield may be passed to the system (800) by the oilfield inputs/outputs (838) as shown, for example, in FIG. 8. As new data is collected, the process may be repeated (Step 914). The new data may suggest that changes in the oilfield plan, the system, the process, assumptions in the process and/or other parts of the operation may need adjustment. Such adjustments may be made as necessary. The data collected and the processes performed may be stored and reused over time. The processes may be re-used and reviewed as needed to determine the history of the oilfield operations and/or any changes that may have occurred. As new models are generated, it may be desirable to reconsider existing models. The existing oilfield models may be selectively refined as new oilfield models are generated.

The steps (902)-(912) may be repeated as desired (Step 914). For example, it may be desirable to repeat the steps based on new information, additional inputs and other factors. New inputs may be generated using data acquisition tools at the existing oilfield sites and/or at other locations along the oilfield. Other additional data may also be provided. As new inputs are received, the process may be repeated. The data collected from a variety of sources may be collected and used across other oilfields. The steps may also be repeated to test various configurations and/or processes. Various outputs may be compared and/or analyzed to determine the optimum oilfield model and/or process.

Reports of the data, modeling operation, plans or other information may be generated (Step 916). The reports may be generated using, for example, the integrated report generator (e.g. (840) of FIG. 8 or (607) of FIG. 6A). The reports may be generated at any time during the operation and in any desired format. The reports may be tailored to a desired format and adjusted as needed. The reports may provide data, results, processes and other features of the operation. Reports, visualizations and other displays may be generated for use by on or offsite users. Such displays may provide multidimensional images of modeling and/or simulation operations. The reports generated may be stored, for example in databases (832), (836) of FIG. 8. The reports may be used for further analysis, for tracing the process and/or analyzing operations. The reports may provide various layouts of real-time, historical data, monitored, analyzed, modeled and/or other information.

FIG. 9B depicts a method (900b) for performing an oilfield operation involving collecting oilfield data (Step 922), positioning a plurality of oilfield modules in a single application (Step 919), selectively connecting the oilfield modules for interaction therebetween (Step 924), and generating oilfield model(s) by performing modeling using the oilfield modules and the oilfield data (Step 926).

In this method (900b), the oilfield data is collected in a plurality of databases (Step 922). The databases are similar to those described with respect to step (902) of FIG. 9A. The data may be preprocessed (Step 921) to ensure the quality of the data. Calibrations, error checks, scaling, filtering, smoothing, validation, and other quality checks may be performed to verify and/or optimize the data. The data may also be translated, converted, mapped, packaged or otherwise conformed to facilitate processing. In some cases, certain data may be used that is of a specific type, such geological data, geophysical data, reservoir engineering data, production data, drilling data, economic data, and/or petrophysical data, and may be selectively sorted and stored for use.

The modules may be placed in an application (Step 919) as previously described with respect to step 903. The oilfield modules may be selectively connected (Step 924) as previously described with respect to step 904 of FIG. 9A.

One or more of the selected modules may optionally be provided with additional functionality (Step 923). The added functionality may be added via at least one extension, such as extension (842) of FIG. 8. Economics functionality may also be added for performing economics modeling (925). This functionality may be added as a module (e.g., module (720b) of FIG. 7B) or as a layer (e.g., layer (834) of FIG. 8). The added functionality of the extension and/or economics may be performed at any time through the process as desired. Preferably, these functionalities are used to assist in the optimization of the oilfield model.

One or more oilfield models may be generated (Step 926) as previously described with respect to step 906 of FIG. 9A. The method may further involve generating an oilfield plan (Step 928), implementing the oilfield plan (Step 930), monitoring the oilfield operations (Step 932), generating reports (Step 936) and repeating the process (Step 934). These steps may be performed as previously described with respect to steps 910, 912, 916, and 914, respectively, of FIG. 9A.

The oilfield plan may be adjusted (Step 933) during the process. As new data is received, or the modeling operation proceeds, the oilfield plan may need adjustment. New data may indicate that conditions at the oilfield have changed, and the oilfield plan may need to adapt to those changes. The modeling process may be refined, resulting in different oilfield models which suggest changes to the oilfield plan. The oilfield plan may be automatically or manually adjusted based on new data, results, criteria or for other reasons.

At least some steps in the method may be performed simultaneously, in a different order, or omitted. As shown in FIGS. 9A and 9B, the reports may be generated before and/or after the steps of the method are repeated. It will be appreciated that the reports may be performed at any time as desired. Other steps, such as the collection of oilfield data, the preprocessing of data, the implementation of the oilfield plan and other steps may be repeated and performed at various times throughout the process.

The systems and methods provided relate to acquisition of hydrocarbons from an oilfield. It will be appreciated that the same systems and methods may be used for performing subsurface operations, such as mining, water retrieval and acquisition of other underground materials.

While specific configurations of systems for performing oilfield operations are depicted, it will be appreciated that various combinations of the described systems may be provided. For example, various combinations of selected modules may be connected using the connections previously described. One or more modeling systems may be combined across one or more oilfields to provide tailored configurations for modeling a given oilfield or portions thereof. Such combinations of modeling may be connected for interaction therebetween. Throughout the process, it may be desirable to consider other factors, such as economic viability, uncertainty, risk analysis and other factors. It is, therefore, possible to impose constraints on the process. Modules may be selected and/or models generated according to such factors. The process may be connected to other model, simulation and/or database operations to provide alternative inputs.

It will be understood from the foregoing description that various modifications and changes may be made in the preferred and alternative embodiments of the present invention without departing from its true spirit. For example, during a real-time drilling of a well it may be desirable to update the oilfield model dynamically to reflect new data, such as measured surface penetration depths and lithological information from the real-time well logging measurements. The oilfield model may be updated in real-time to predict the location in front of the drilling bit. Observed differences between predictions provided by the original oilfield model concerning well penetration points for the formation layers may be incorporated into the predictive model to reduce the chance of model predictability inaccuracies in the next portion of the drilling process. In some cases, it may be desirable to provide faster model iteration updates to provide faster updates to the model and reduce the chance of encountering and expensive oilfield hazard.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A system for performing oilfield operations for an oilfield, the oilfield having a subterranean formation with geological structures and reservoirs therein, comprising:
a plurality of oilfield modules executing on a processor in a surface unit to generate at least one oilfield model based on oilfield data collected from the oilfield, each of the plurality of oilfield modules having one or more software applications positioned therein modeling at least a portion of the oilfield, wherein at least one of the plurality of oilfield modules is configured to:
determine, to obtain a decision, whether to take action based on modeling performed by at least one other oilfield module;
selectively connect, in response to a pre-determined event and based on the decision by the at least one of the plurality of oilfield modules, to a portion of the plurality of oilfield modules via a dynamic connection;
detect a control setting change from the oilfield data, wherein the control setting change adjusts oilfield operations; and
generate modeling data based on the control setting change; and
a plurality of connections for connecting the plurality of oilfield modules, wherein the plurality of connections comprise the dynamic connection configured to communicate the control setting change and knowledge associated with the control setting change to the portion of the plurality of oilfield modules, and wherein the knowledge comprises the modeling data generated by the at least one of the plurality of oilfield modules,
wherein the at least one oilfield model is revised based on the control setting change and the knowledge associated with the control setting change using at least the portion of the plurality of oilfield modules.

2. The system of claim 1, further comprising at least one internal database positioned in the application and operatively connected to the plurality of modules for communication therewith, wherein the at least one internal database stores the knowledge associated with the control setting change.

3. The system of claim 2, further comprising at least one external database operatively connected to the internal database.

4. The system of claim 1,
wherein communicating the control setting change and the knowledge associated with the control setting change is activated based on pre-determined criteria.

5. The system of claim 4, wherein activation based on the pre-determined criteria is performed without intervention from a user of the application.

6. The system of claim 1, further comprising oilfield inputs/outputs operatively connected to at least one of the oilfield modules for selectively interacting with the oilfield.

7. The system of claim 1, further comprising an economics layer in the application for performing economic analysis of the oilfield.

8. The system of claim 1, wherein the at least one oilfield model comprises at least one selected from a group consisting of an earth model and a surface model.

9. A system for performing oilfield operations for an oilfield, the oilfield having a subterranean formation with geological structures and reservoirs therein, comprising:
a plurality of oilfield modules, each having one or more software applications positioned therein modeling at least a portion of the oilfield, the plurality of oilfield modules executing on a processor in a surface unit to generate at least one oilfield model by combining contributions from the plurality of oilfield modules;
at least one internal database operatively connected to at least one of the plurality of oilfield modules, wherein at least one internal database stores knowledge comprising process information describing modeling performed by an oilfield module of the plurality of oilfield modules, wherein the modeling generates a change event in a portion of the at least one oilfield model contributed by the oilfield module; and
a plurality of connections for selectively connecting at least a portion of the plurality of oilfield modules, at least one of the plurality of connections being an integrated connection, connecting the oilfield module and another oilfield module of the plurality of oilfield modules, configured to communicate the change event and the knowledge to the another oilfield module,
wherein the change event is reversed by the another oilfield module based on the process information contained in the knowledge.

10. The system of claim 9,
wherein communicating the change event and the knowledge is activated by a user of the application.

11. The system of claim 9, further comprising at least one external database operatively connected to the internal database.

12. The system of claim 9, wherein the at least one connection further comprises at least one dynamic connection providing knowledge sharing for unified modeling therebetween.

13. The system of claim 9, further comprising oilfield inputs/outputs operatively connected to at least one of the oilfield modules for selectively communicating with the oilfield.

14. The system of claim 9, further comprising an economics layer in the application for performing economic analysis.

15. The system of claim 9, wherein the at least one oilfield model comprises at least one selected from a group consisting of an earth model and a surface model.

16. A method of performing oilfield operations for an oilfield, the oilfield having a subterranean formation with geological structures and reservoirs therein, comprising:
collecting oilfield data;
positioning a plurality of oilfield modules to generate at least one oilfield model based on oilfield data collected from the oilfield, each of the plurality of oilfield modules having one or more software applications positioned therein modeling at least a portion of the oilfield;
determining, by an oilfield module of the plurality of oilfield modules to obtain a decision, whether to take action based on modeling performed by at least one other oilfield module;
selectively connecting, in response to a pre-determined event and based on the decision by the oilfield module, the oilfield module to a portion of the plurality of oilfield modules via a dynamic connection for knowledge sharing;
generating at least one oilfield model using the oilfield data and the plurality of oilfield modules;
detecting, by the oilfield module, a control setting change from the oilfield data, wherein the control setting change adjusts oilfield operations;
communicating the control setting change and knowledge associated with the control setting change to the portion of the plurality of oilfield modules using the dynamic connection, wherein the knowledge comprises modeling data generated by the oilfield module based on the control setting change; and revising the at least one oilfield model based on the control setting change and the knowledge associated with the control setting change using at least the portion of the plurality of oilfield modules.

17. The method of claim 16,
wherein communicating the control setting change and the knowledge associated with the control setting change is activated based on pre-determined criteria.

18. The method of claim 17, wherein activation based on the pre-determined criteria is performed without intervention from a user of the application.

19. The method of claim 17, further comprising developing an oilfield plan based on the at least one oilfield model and implementing the oilfield plan at the oilfield.

20. The method of claim 19, further comprising:

monitoring the oilfield operations to generate new oilfield data; and adjusting the oilfield plan based on new oilfield data, wherein the change is resulted from modeling using new oilfield data.

* * * * *